United States Patent
Kimura et al.

(10) Patent No.: US 11,441,680 B2
(45) Date of Patent: Sep. 13, 2022

(54) CONTROL DEVICE FOR AUTOMATIC TRANSMISSION

(71) Applicant: Mazda Motor Corporation, Hiroshima (JP)

(72) Inventors: Takahiro Kimura, Aki-gun (JP); Kenji Sawa, Aki-gun (JP); Yasuo Shigenaka, Aki-gun (JP)

(73) Assignee: Mazda Motor Corporation, Hiroshima (JP)

(*) Notice: Subject to any disclaimer, the term of this patent is extended or adjusted under 35 U.S.C. 154(b) by 168 days.

(21) Appl. No.: 17/072,317

(22) Filed: Oct. 16, 2020

(65) Prior Publication Data
US 2021/0148464 A1 May 20, 2021

(30) Foreign Application Priority Data

Nov. 18, 2019 (JP) .............................. JP2019-207737

(51) Int. Cl.
*F16H 63/34* (2006.01)
*B60T 1/00* (2006.01)
*F02N 11/08* (2006.01)

(52) U.S. Cl.
CPC .......... *F16H 63/3483* (2013.01); *B60T 1/005* (2013.01); *F02N 11/08* (2013.01); *F02N 2200/0815* (2013.01)

(58) Field of Classification Search
CPC .............. F16H 63/3483; F16H 63/48; F16H 2059/366; F16H 2312/20; F16H 63/38; F16H 63/50; F16H 63/3416; B60T 1/005
See application file for complete search history.

(56) References Cited

U.S. PATENT DOCUMENTS

| | | | |
|---|---|---|---|
| 2011/0294622 A1 | 12/2011 | Kimura et al. | |
| 2016/0152224 A1* | 6/2016 | Tabata | B60W 10/06 180/65.265 |

(Continued)

FOREIGN PATENT DOCUMENTS

| | | | | |
|---|---|---|---|---|
| DE | 102012217704 A1 * | 6/2014 | ............. | B60T 1/005 |
| JP | 2017122496 A | 7/2017 | | |
| JP | 2017122498 A | 7/2017 | | |

OTHER PUBLICATIONS

European Patent Office, Extended European Search Report Issued in Application No. 20206912.6, dated May 31, 2021, Germany, 12 pages.

*Primary Examiner* — Richard W Ridley
*Assistant Examiner* — Aimee Tran Nguyen
(74) *Attorney, Agent, or Firm* — Alleman Hall Creasman & Tuttle LLP

(57) ABSTRACT

A control device for an automatic transmission includes a parking lock mechanism configured to lock/unlock rotation of a power transmission shaft by setting a parking rod at locked/unlocked position when the automatic transmission is in a parking range or in other ranges, a parking drive mechanism configured to set the parking rod at the unlocked position by supplying hydraulic pressure, a hydraulic pressure control valve configured to intercept the hydraulic pressure supply to the parking drive mechanism when power is supplied thereto, and supply the pressure when power is not supplied thereto, a regulating mechanism configured to regulate the movement of the parking rod at the locked position, and a controller configured to, when the parking rod is at the locked position, maintain supply of power to the valve, while an engine speed is higher than a given value, after power of a vehicle is turned OFF.

14 Claims, 12 Drawing Sheets

(56) References Cited

U.S. PATENT DOCUMENTS

2017/0016535 A1    1/2017  Tachibanada et al.
2017/0268672 A1*   9/2017  Mukai ................... F16H 63/483
2020/0149631 A1*   5/2020  Tachibanada ........... B60T 1/005

* cited by examiner

CONTROL DEVICE FOR AUTOMATIC TRANSMISSION

TECHNICAL FIELD

The present disclosure relates to a control device for an automatic transmission which controls switching of a parking range of the automatic transmission.

BACKGROUND OF THE DISCLOSURE

For example, this kind of art is disclosed in JP2017-122496A. In detail, JP2017-122496A discloses a parking control device for an automatic transmission, which includes (1) a parking lock mechanism, (2) a parking drive mechanism, and (3) a regulating mechanism. (1) The parking lock mechanism locks rotation of a power transmission shaft of the automatic transmission, when the automatic transmission is in a parking range, by setting a parking rod at a locked position on one side in the axial direction of the parking rod. The parking lock mechanism unlocks the rotation of the power transmission shaft of the automatic transmission, when the automatic transmission is in ranges other than the parking range, by setting the parking rod at an unlocked position on the other side in the axial direction. (2) The parking drive mechanism sets the parking rod at the locked position by biasing the parking rod, and sets the parking rod at the unlocked position using hydraulic pressure generated by an engine. (3) The regulating mechanism regulates a movement of the parking rod to the unlocked position, when the parking rod is at the locked position.

Here, hydraulic pressure generated by the engine is supplied to the parking drive mechanism described above by using a hydraulic pressure control valve which is an electromagnetic valve (solenoid). Typically, the hydraulic pressure control valve intercepts the supply of hydraulic pressure to the parking drive mechanism when power is supplied, and on the other hand, it supplies hydraulic pressure to the parking drive mechanism when power is not supplied.

If such a hydraulic pressure control valve is used, the following problem may occur when power of the vehicle is turned OFF (in other words, "ignition OFF") while the regulating mechanism regulates the movement of the parking rod at the locked position. When the power of the vehicle is turned OFF, since the supply of power to the hydraulic pressure control valve is stopped, it is left in a state where the hydraulic pressure can be supplied to the parking drive mechanism. Fundamentally, when the power of the vehicle is turned OFF, the hydraulic pressure is not given to the parking drive mechanism because the engine speed is fully lowered. However, the engine speed may be comparatively high for a while after the power of the vehicle is turned OFF, and in such a case, the hydraulic pressure is given to the parking drive mechanism. Thus, when the hydraulic pressure acts to move the parking rod, of which the movement is regulated by the regulating mechanism, from the locked position to the unlocked position, the parking rod may interfere (e.g., collide) with the regulating mechanism, and therefore, the parking rod and the regulating mechanism may be damaged.

On the other hand, also when the power of the vehicle is turned ON (in other words, "ignition ON") while the regulating mechanism regulates the movement of the parking rod at the locked position, the following problem may occur. When the power of the vehicle is turned ON, the supply of power to the hydraulic pressure control valve is started, but the hydraulic pressure control valve may not promptly intercept the hydraulic pressure being supplied to the parking drive mechanism. This is because a certain period of time is required for actually supplying the power to the hydraulic pressure control valve after the power is turned ON, or a certain period of time is required for the hydraulic pressure control valve actually operating by the supply of power after the power is turned ON. On the other hand, after the power of the vehicle is turned ON, the engine speed may rise immediately. In such a case, if the hydraulic pressure control valve does not promptly intercept the hydraulic pressure being supplied to the parking drive mechanism, the hydraulic pressure is given to the parking drive mechanism. Thus, when the hydraulic pressure acts to move the parking rod, movement of which is regulated by the regulating mechanism, from the locked position to the unlocked position, the parking rod may interfere (e.g., collide) with the regulating mechanism, and therefore, the parking rod and the regulating mechanism may be damaged.

SUMMARY OF THE DISCLOSURE

The present disclosure is made in view of solving the above problems of the conventional art, and one purpose thereof is to provide a control device for an automatic transmission having a regulating mechanism which regulates movement of a parking rod at a locked position, capable of certainly preventing damage due to an interference of the parking rod with the regulating mechanism when power of a vehicle is turned ON or when the power is turned OFF.

According to one aspect of the present disclosure, a control device for an automatic transmission is provided, which includes a parking lock mechanism, a parking drive mechanism, a hydraulic pressure control valve, a regulating mechanism, and a controller. The parking lock mechanism is provided with a parking rod, locks rotation of a power transmission shaft of the automatic transmission by setting the parking rod at a locked position on one side in an axial direction of the parking rod, when the automatic transmission is in a parking range, and unlocks the rotation of the power transmission shaft by setting the parking rod at an unlocked position on the other side in the axial direction, when the automatic transmission is in ranges other than the parking range. The parking drive mechanism sets the parking rod at the locked position by biasing the parking rod, and sets the parking rod at the unlocked position by supplying hydraulic pressure generated by operating an engine. The hydraulic pressure control valve intercepts the supply of the hydraulic pressure to the parking drive mechanism when power is supplied thereto, and supplies the hydraulic pressure to the parking drive mechanism when power is not supplied thereto. The regulating mechanism regulates the movement of the parking rod to the unlocked position when the parking rod is at the locked position. The controller controls the supply of power to the hydraulic pressure control valve. When the parking rod is at the locked position, after power of a vehicle is turned OFF, the controller maintains the supply of power to the hydraulic pressure control valve, while an engine speed of the engine is higher than a given value.

According to this configuration, when the parking rod is at the locked position (i.e., when the regulating mechanism regulates the movement of the parking rod to the unlocked position), the supply of power to the hydraulic pressure control valve is maintained while the engine speed of the engine is higher than the given value even after the power of the vehicle is turned OFF. In other words, the supply of power (supplied current or voltage) in an amount larger than zero to the hydraulic pressure control valve is maintained. Thus, the supply of the hydraulic pressure to the parking drive mechanism can be intercepted. Therefore, according to this configuration, when the power of the vehicle is turned OFF, the movement of the parking rod to the unlocked position by the parking drive mechanism can be appropriately reduced, and thereby, an interference of the parking rod with the regulating mechanism can be prevented. As a result, damage to the parking rod and the regulating mechanism can be certainly prevented.

The hydraulic pressure control valve may be an on-off valve. After the power of the vehicle is turned OFF, the controller may supply the power to the hydraulic pressure control valve to maintain an ON state of the hydraulic pressure control valve, while the engine speed of the engine is higher than the given value.

According to this configuration, since the power is supplied to the hydraulic pressure control valve as the on-off valve so as to maintain the ON state of the hydraulic pressure control valve in this situation, the hydraulic pressure is certainly prevented from being supplied to the parking drive mechanism.

After the power of the vehicle is turned OFF, the controller may maintain the supply of power to the hydraulic pressure control valve, while the engine speed of the engine is higher than the given value, and suspend the supply of power to the hydraulic pressure control valve, when the engine speed of the engine becomes the given value or below.

According to this configuration, by suspending the supply of power to the hydraulic pressure control valve when the engine speed becomes the given value or below, the power consumption for supplying the power to the hydraulic pressure control valve can appropriately be reduced.

While the power of the vehicle is OFF, the controller may start the supply of power to the hydraulic pressure control valve, before the power of the vehicle is turned ON.

According to this configuration, while the power of the vehicle is OFF, the supply of power to the hydraulic pressure control valve is started before the power of the vehicle is turned ON. Therefore, when the power of the vehicle is turned ON, the supply of power to the hydraulic pressure control valve is completed and the hydraulic pressure control valve is set to be able to certainly intercept the supply of hydraulic pressure to the parking drive mechanism. Thus, even when the engine speed rises immediately after the power of the vehicle is turned ON, the movement of the parking rod to the unlocked position by the parking drive mechanism is prevented, which can prevent the interference of the parking rod with the regulating mechanism. As a result, damage to the parking rod and the regulating mechanism can be certainly prevented.

While the power of the vehicle is OFF, the controller may start the supply of power to the hydraulic pressure control valve, when a door of the vehicle is opened.

According to this configuration, the supply of power to the hydraulic pressure control valve is started when the door of the vehicle is opened while the power of the vehicle is OFF, at which the possibility that the power of the vehicle is turned ON is high. Therefore, the power consumption for supplying the power to the hydraulic pressure control valve can appropriately be reduced.

According to another aspect of the present disclosure, a control device for an automatic transmission is provided, which includes a parking lock mechanism, a parking drive mechanism, a hydraulic pressure control valve, a regulating mechanism, and a controller. The parking lock mechanism is provided with a parking rod, locks rotation of a power transmission shaft of the automatic transmission by setting the parking rod at a locked position on one side in an axial direction of the parking rod, when the automatic transmission is in a parking range, and unlocks the rotation of the power transmission shaft by setting the parking rod at an unlocked position on the other side in the axial direction, when the automatic transmission is in ranges other than the parking range. The parking drive mechanism sets the parking rod at the locked position by biasing the parking rod, and sets the parking rod at the unlocked position by supplying hydraulic pressure generated by operating an engine. The hydraulic pressure control valve intercepts the supply of the hydraulic pressure to the parking drive mechanism when power is supplied thereto, and supplies the hydraulic pressure to the parking drive mechanism when power is not supplied thereto. The regulating mechanism regulates the movement of the parking rod to the unlocked position when the parking rod is at the locked position. The controller controls the hydraulic pressure control valve and the engine. After power of a vehicle is turned ON, the controller reduces an increase in an engine speed of the engine, during a period from an issuance of a power supply command to the hydraulic pressure control valve to a given period of time being elapsed.

According to this configuration, after the power of the vehicle is turned ON, the controller reduces the increase in the engine speed, during the period from the issuance of the power supply command to the hydraulic pressure control valve to the given period of time being elapsed. Thus, after the power of the vehicle is turned ON, the generation of the hydraulic pressure by the operation of the engine is prevented until, for example, the hydraulic pressure control valve becomes able to intercept the supply of the hydraulic pressure to the parking drive mechanism so as not to give the hydraulic pressure to the parking drive mechanism. Therefore, when the power of the vehicle is turned ON, the movement of the parking rod to the unlocked position by the parking drive mechanism can be appropriately prevented, which can prevent the interference of the parking rod with the regulating mechanism. As a result, it becomes possible to certainly prevent damage to the parking rod and the regulating mechanism.

The controller may reduce the increase in the engine speed by inhibiting starting of the engine by a starter motor. The controller may control the starter motor so that the starter motor rotates a flywheel to start the engine after determining that the given period of time is elapsed.

DETAILED DESCRIPTION OF THE DISCLOSURE

Hereinafter, a control device for an automatic transmission according to one embodiment of the present disclosure is described with reference to the accompanying drawings.
<Configuration of Vehicle>

Figure 1:
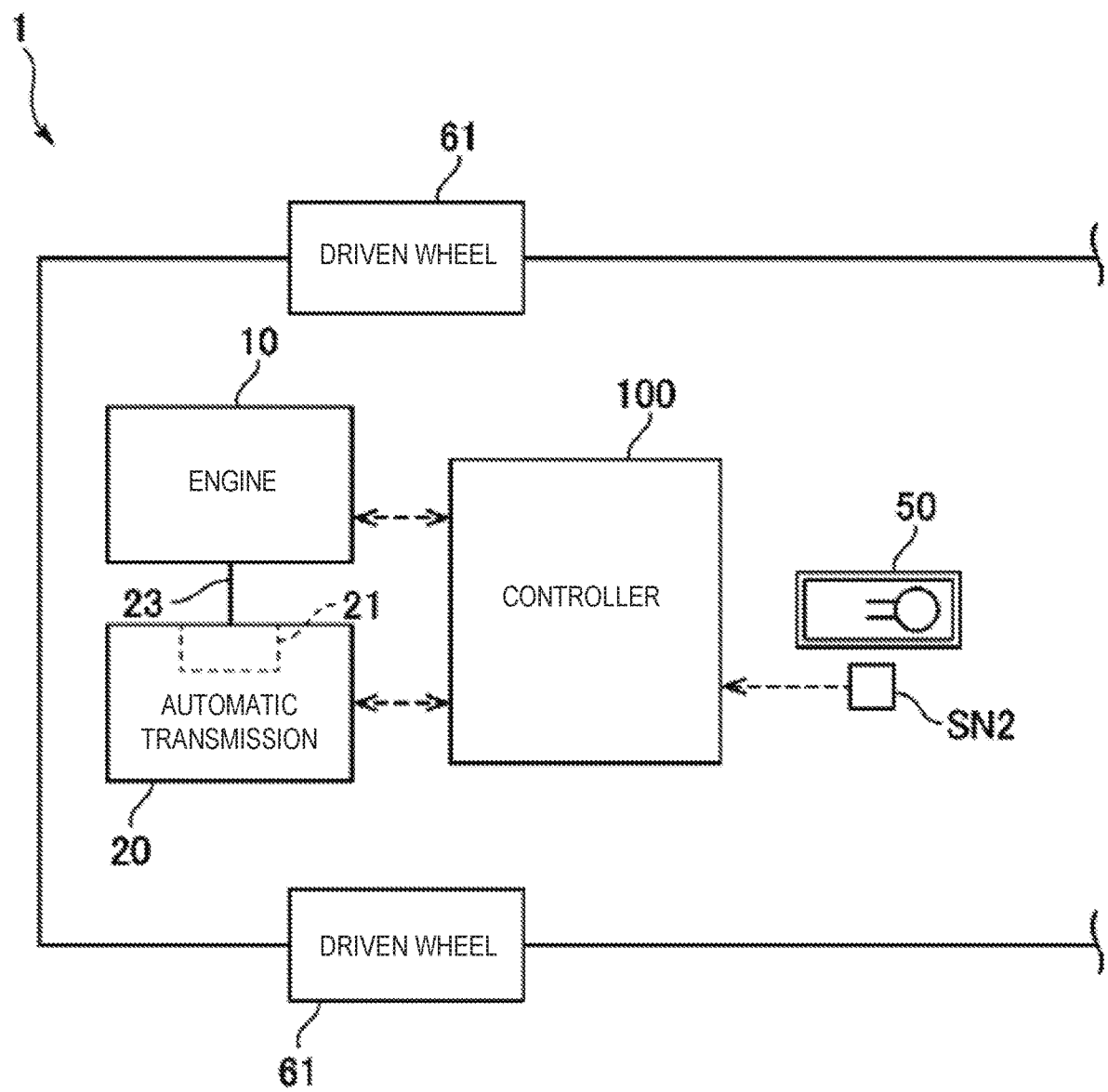
FIG. 1 is a schematic view illustrating a front part of a vehicle to which a control device for an automatic transmission according to one embodiment of the present disclosure is mounted.

FIG. 1 is a schematic view illustrating a front part of a vehicle to which the control device for the automatic transmission according to this embodiment of the present disclosure is mounted. As illustrated in FIG. 1, a vehicle 1 is of a front-engine front-drive (FF) type. An engine 10 is mounted transversely on the front side of the vehicle 1, and an automatic transmission 20 is disposed on the left side of the engine 10. An output from the engine 10 is transmitted to driven wheels 61 through the automatic transmission 20 so that the vehicle 1 travels. Note that the vehicle 1 may be of a front-engine rear-drive (FR) type in which driven wheels (not illustrated) located on the rear side of the vehicle are driven.

A shift lever 50 is disposed inside a cabin of the vehicle 1. The shift lever 50 is to select a shift range of the automatic transmission 20, and the shift range includes "P" (parking range), "R" (reverse range), "N" (neutral range), and "D" (drive range). An operator of the vehicle 1 operates the shift lever 50 to select a desired shift range. Note that in the following, the parking range is suitably referred to as the "P-range," and shift ranges other than the parking range is suitably referred to as the "Non-P-range(s)."

The automatic transmission 20 is of a shift-by-wire type. The shift range selected by the operation of the shift lever 50 is detected by a selector sensor SN2, and an electrical signal based on the detection result of the selector sensor SN2 is inputted into a controller 100. Then, the shift range of the automatic transmission 20 is switched by an output signal from the controller 100 based on the electrical signal.

Moreover, the automatic transmission 20 has a parking device 21 which regulates (locks) operation (rotation) of a power transmission shaft 23 for transmitting power from the engine 10, when the P-range is selected. Note that the power transmission shaft 23 may be directly coupled to the engine 10, or may be indirectly coupled to the engine 10 through a torque converter, etc.
<Structure of Parking Device>

Figure 2:
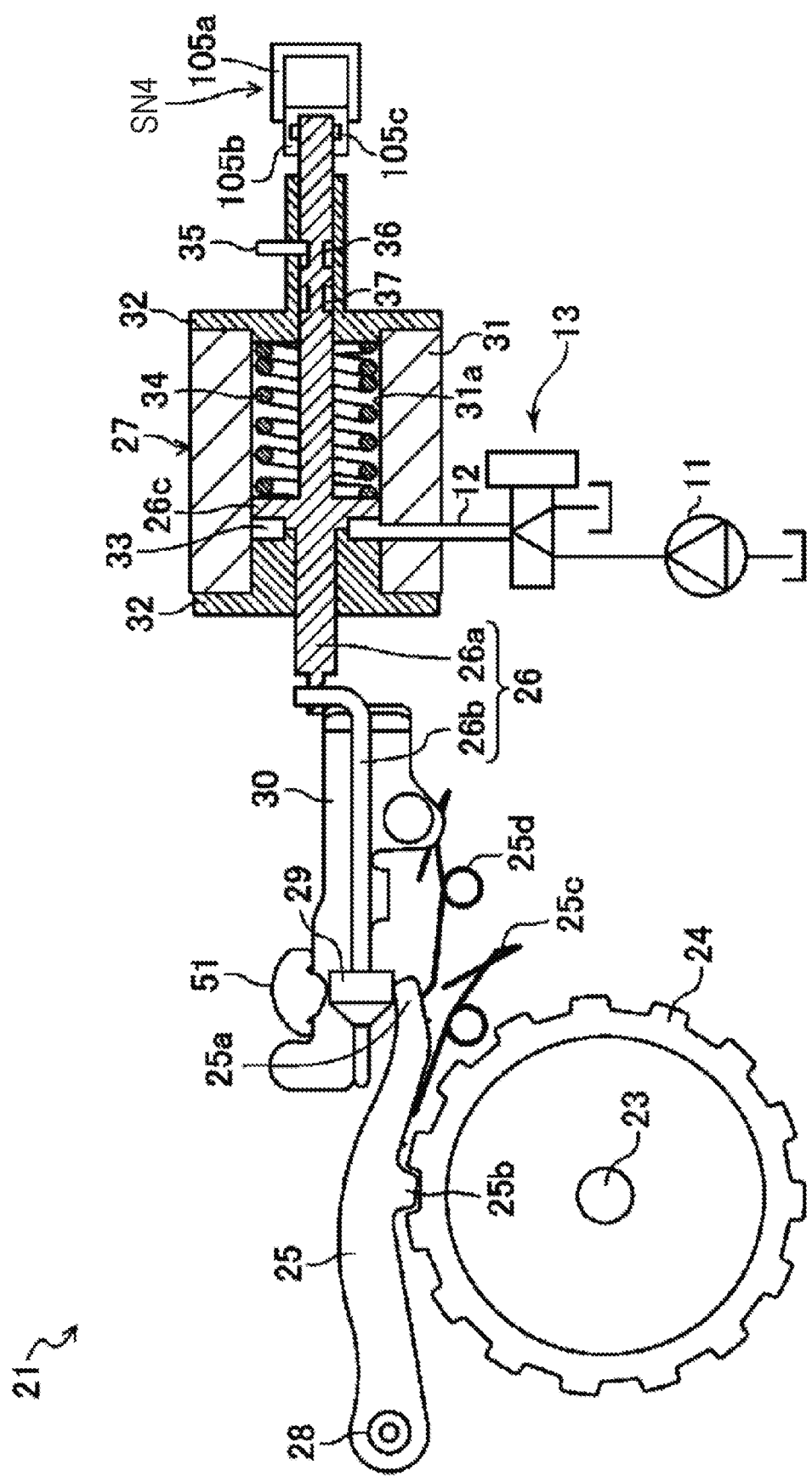
FIG. 2 is a cross-sectional view schematically illustrating a parking device in a locked state in this embodiment of the present disclosure.
Figure 3:
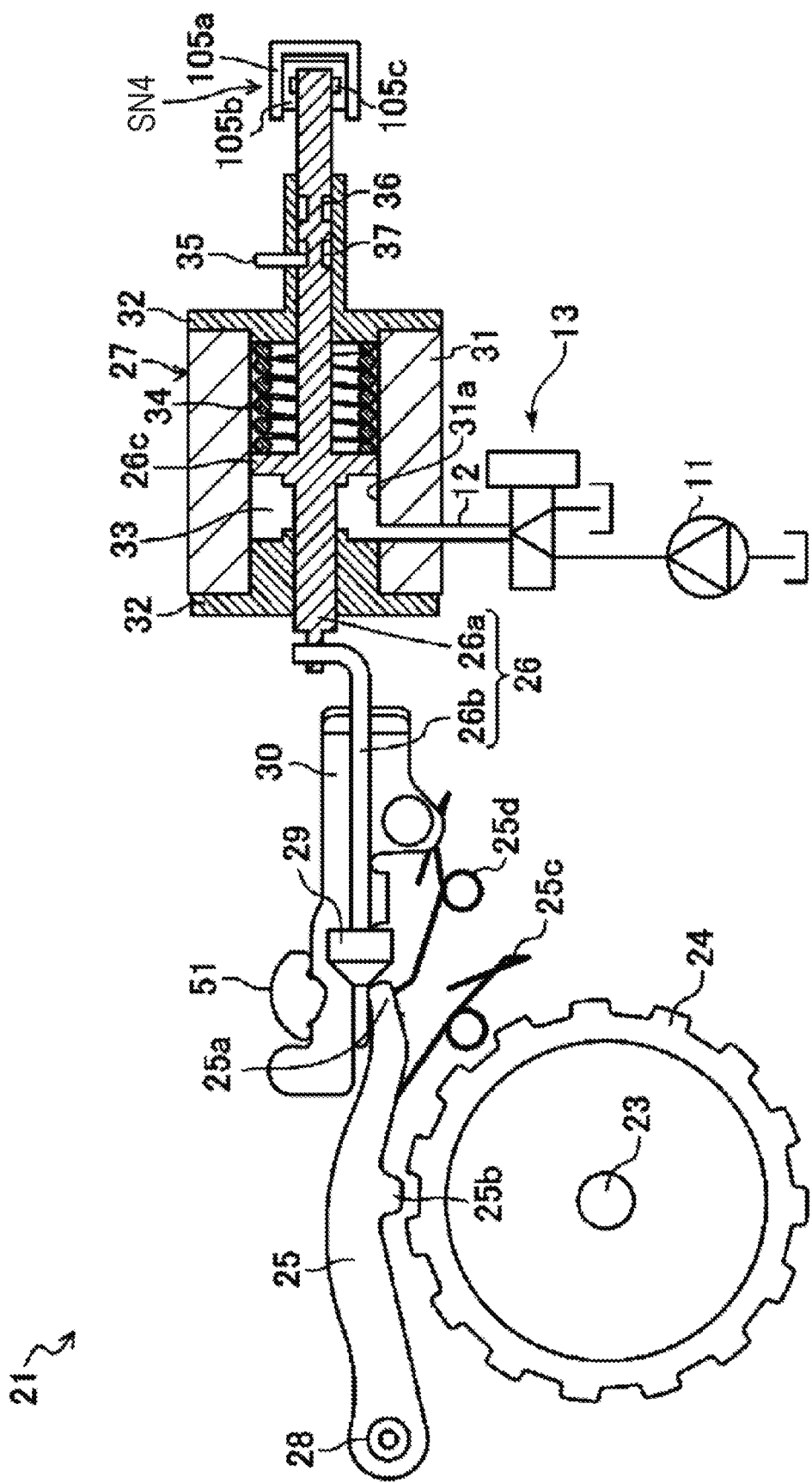
FIG. 3 is a cross-sectional view schematically illustrating the parking device in an unlocked state in this embodiment of the present disclosure.

Next, referring to FIGS. 2 and 3, a concrete structure of the parking device 21 according to this embodiment of the present disclosure is described. FIGS. 2 and 3 are cross-sectional views schematically illustrating the parking device 21 according to this embodiment of the present disclosure. Particularly, FIG. 2 is a cross-sectional view schematically illustrating the parking device 21 in a locked state, and FIG. 3 is a cross-sectional view schematically illustrating the parking device 21 in an unlocked state.

As illustrated in FIGS. 2 and 3, the parking device 21 of the automatic transmission 20 is disposed inside a transmission case (not illustrated) of the automatic transmission 20. The parking device 21 mainly includes a parking gear 24 attached to the power transmission shaft 23, a parking pole 25 which engages with the parking gear 24 to lock the rotation of the power transmission shaft 23 in the P-range, a parking rod 26 which moves in the axial direction to switch the locked state (engaged state) and the unlocked state (disengaged state) between the parking pole 25 and the parking gear 24, an actuator 27 which causes the parking rod 26 to move in the axial direction, a stop 35 which regulates the axial movement of the parking rod 26 in the locked state and the unlocked state, a solenoid 40 which cancels the regulation of the parking rod 26 by the stop 35, and a rod position sensor SN4 which detects a position of the parking rod 26. Note that in the following description, the parking pole 25 side (left side in FIGS. 2 and 3) of the parking rod 26 in the axial direction is referred to as a "lock side," and the opposite side from the parking pole 25 (right side in FIGS. 2 and 3) is referred to as an "unlock side."

As illustrated in FIGS. 2 and 3, the parking pole 25 is supported at an end part on the lock side by the transmission case so as to be rotatable through a pin 28, and a pole pressing part 25a which is pressed by the parking rod 26 (in detail, a parking cam 29 described later) is formed in an end part on the unlock side. A protrusion 25b which engages with the parking gear 24 is formed between the support part supported by the pin 28 and the pole pressing part 25a. Moreover, two parking pole biasing springs 25c and 25d which bias the pole pressing part 25a in a disengaging direction (the counter clockwise direction in FIGS. 2 and 3) of the parking gear 24 and the protrusion 25b are attached to the parking pole 25. The parking pole biasing springs 25c and 25d are twist coil springs, where the parking pole biasing spring 25c contacts the pole pressing part 25a at an end part on the lock side and contacts the transmission case at an end part on the unlock side. On the other hand, the parking pole biasing spring 25d contacts the pole pressing part 25a at an end part on the lock side and contacts a bracket 30 (described later) at an end part on the unlock side.

As illustrated in FIG. 2, when the parking rod 26 moves to the lock side, the pole pressing part 25a is pressed by the parking rod 26, and the parking pole 25 rotates around the pin 28 in an engaging direction of the protrusion 25b with the parking gear 24 (the clockwise direction in FIG. 2), while resisting the biasing force of the parking pole biasing springs 25c and 25d. On the other hand, as illustrated in FIG. 3, when the parking rod 26 moves to the unlock side, the parking pole 25 rotates around the pin 28 in a disengaging direction of the protrusion 25b from the parking gear 24, by the biasing force of the parking pole biasing springs 25c and 25d.

As illustrated in FIGS. 2 and 3, the parking rod 26 is comprised of a piston rod 26a disposed at the actuator 27 and a push rod 26b which presses the parking pole 25 in the locked state.

The push rod 26b is disposed so that it is supported by the bracket 30, and an end part of the push rod 26b on the lock side is provided with the parking cam 29 which presses the pole pressing part 25a in the engaging direction of the protrusion 25b of the parking pole 25 with the parking gear 24 in the locked state. The parking cam 29 has a shape in which a cylindrical body and a truncated cone are combined, and the truncated cone is attached to a surface of the cylindrical body on the lock side so that the diameter is reduced toward the lock side. The parking cam 29 serves as guiding the parking pole 25 to the parking gear 24 side when it rotates the parking pole 25 from an unlocked state to a locked state. That is, when the parking rod 26 moves to the lock side, the parking pole 25 is guided by the diameter-reduced part of the parking cam 29 and rotates about the pin 28. Moreover, the bracket 30 is provided with a guide 51 which guides the movement of the parking cam 29.

An end part of the push rod 26b on the unlock side is curved so as to be substantially perpendicular to the longitudinal direction of the push rod 26b (i.e., the axial direction of the parking rod 26), and this curved part is connected to an end part of the piston rod 26a on the lock side. A piston 26c is formed in the piston rod 26a so that it is fitted in a cylinder 31a (described later).

Moreover, first and second engagement grooves 36 and 37 which engage with the stop 35 are formed in an end part of the piston rod 26a on the unlock side. The first engagement groove 36 is a groove with which the stop 35 engages when the parking pole 25 is in the locked state. On the other hand, the second engagement groove 37 is located on the lock side of the first engagement groove 36, and the second engagement groove 37 is a groove with which the stop 35 engages when the piston rod 26a moves to the unlock side, and the parking pole 25 is in the unlocked state. Groove widths of the first and second engagement grooves 36 and 37 are larger than a thickness of the stop 35 in the axial direction of the parking rod 26. Note that the first and second engagement grooves 36 and 37 may be formed all around the piston rod 26a in the circumferential direction, or may only be formed in a part thereof with which the stop 35 engages.

The actuator 27 is a hydraulic actuator. The actuator 27 has a housing formed by a cylindrical case 31 which has the cylinder 31a, and sealing members 32 which close openings of the cylinder 31a on both sides. The piston rod 26a extends so that it penetrates the sealing member 32 on the lock side, passes through the inside of the cylinder 31a, and penetrates the sealing member 32 on the unlock side. As described above, the piston 26c is fitted into the cylinder 31a, and divides the cylinder 31a into two closed spaces. Among the divided closed spaces, in the closed space on the lock side of the piston 26c, a hydraulic pressure chamber 33 to which oil is supplied is formed in order to generate a moving force for moving the parking rod 26 (in detail, the piston 26c) to one side in the axial direction (i.e., to the unlock side) so that the parking pole 25 is made into the unlocked state. On the other hand, in the closed space on the unlock side of the piston 26c, a rod biasing spring 34 which biases the parking rod 26 to the other side in the axial direction (i.e., to the lock side) is disposed so that the parking pole 25 is made into the locked state. The rod biasing spring 34 is a compression coil spring, which contacts the piston 26c at an end part on the lock side, and contacts the sealing member 32 at an end part on the unlock side.

As described above, the rod biasing spring 34 biases the parking rod 26 to the lock side. That is, when oil is not supplied to the hydraulic pressure chamber 33 and the moving force based on the pressure inside the hydraulic pressure chamber 33 does not act on the piston 26c, the parking rod 26 moves to the lock side (FIG. 2). At this time, the parking rod 26 is located at a "locked position." On the other hand, when oil is supplied to the hydraulic pressure chamber 33 and the pressure inside the hydraulic pressure chamber 33 is such a pressure that it generates a moving force larger than the biasing force of the rod biasing spring 34, the parking rod 26 moves to the unlock side while resisting the biasing force of the rod biasing spring 34 (FIG. 3). At this time, the parking rod 26 is located at an "unlocked position."

The hydraulic pressure chamber 33 is connected to an oil passage 12 for supplying oil from an oil pump 11 into the hydraulic pressure chamber 33. In this embodiment, the oil pump 11 is disposed inside the transmission case, generates hydraulic pressure to be supplied to friction engagement elements of the automatic transmission 20, and is driven by the engine 10. The oil passage 12 is provided with a hydraulic pressure control valve 13 which supplies oil to the hydraulic pressure chamber 33 or discharges (drains) oil from the hydraulic pressure chamber 33. The oil supplied from the oil pump 11 is supplied to the hydraulic pressure chamber 33 after the hydraulic pressure is adjusted by the hydraulic pressure control valve 13. That is, the hydraulic pressure of the hydraulic pressure chamber 33 is controlled by the hydraulic pressure control valve 13. Note that the hydraulic pressure control valve 13 is, for example, a linear solenoid valve.

Figure 4:
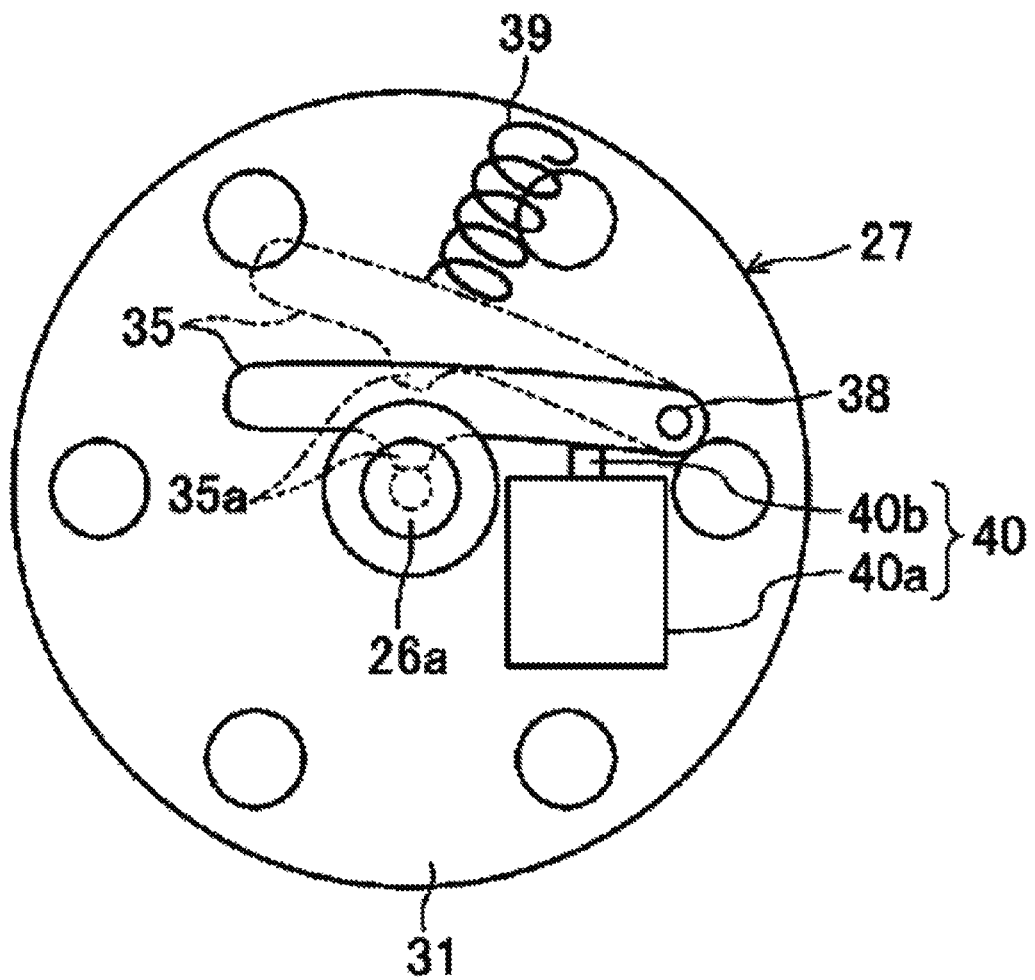
FIG. 4 is a side view schematically illustrating a stop and a solenoid according to this embodiment of the present disclosure.

Next, the stop 35 and the solenoid 40 of the parking device 21 according to this embodiment of the present disclosure are described concretely with reference to FIG. 4. FIG. 4 is a side view illustrating the stop 35 and the solenoid 40, seen from the unlock side.

As illustrated in FIG. 4, the stop 35 is an elongated plate-like member where an engaging pawl 35a is formed. The stop 35 is rotatably supported by the transmission case of the automatic transmission 20 at one end side through a pin 38. A stop biasing spring 39 for biasing the stop 35 in a direction for regulating the axial movement of the parking rod 26 (the counter clockwise direction in FIG. 4: hereinafter, referred to as the "regulating direction") is attached to the stop 35. When the stop 35 rotates around the pin 38 in the regulating direction by the biasing force of the stop biasing spring 39, the engaging pawl 35a engages with the first or second engagement groove 36 or 37 of the parking rod 26. The stop biasing spring 39 is a compression coil spring, and contacts the stop 35 at one end side and contacts the transmission case at the other end side.

The stop 35 regulates the axial movement of the parking rod 26 by the engaging pawl 35a engaging with the first or second engagement groove 36 or 37 provided to the parking rod 26 and contacting a side surface of the first or second engagement groove 36 or 37. That is, even if the parking rod 26 tries to move to the unlock side or the lock side by using the moving force based on the pressure inside the hydraulic pressure chamber 33 or the biasing force of the rod biasing spring 34, the stop 35 (in detail, the engaging pawl 35a of the stop 35) contacts the side surface of the first or second engagement groove 36 or 37 so that the movement of the parking rod 26 is regulated.

The solenoid 40 is a so-called "push-type solenoid," and as illustrated in FIG. 4, it is provided with a solenoid body 40a where a driving coil (not illustrated) is disposed therein, and a movable body 40*b* which is driven by the coil. When operating, the solenoid 40 pushes out the movable body 40*b* to rotate the stop 35 about the pin 38 in a direction to cancel the regulating state (the clockwise direction in FIG. 4: hereinafter, the "freeing direction") while resisting the biasing force of the stop biasing spring 39 so that the stop 35 is made into a "freed state" as illustrated by an imaginary line in FIG. 4. On the other hand, when not operating, the biasing force of the stop biasing spring 39 pushes the movable body 40*b* into the solenoid body 40*a*, the solenoid 40 rotates the stop 35 about the pin 38 in the regulating direction, and makes it into a "regulated state" as illustrated by a solid line in FIG. 4.

The rod position sensor SN4 is disposed at a position of an end part of the parking rod 26 on the unlock side. The rod position sensor SN4 is a magnetic type position sensor, and it is comprised of a substantially C-shaped magnetic sensor 105*a*, and a slide block 105*b* which is slidable inside the C-shape of the magnetic sensor 105*a*. The slide block 105*b* is provided with an engagement part 105*c*, and the engagement part 105*c* engages with the end part of the parking rod 26 on the unlock side to integrally couple the slide block 105*b* to the parking rod 26. Therefore, the slide block 105*b* slides inside of the C-shape of the magnetic sensor 105*a* according to the axial movement of the parking rod 26. The slide block 105*b* has a given magnetic pattern, and by the magnetic sensor 105*a* detecting the magnetic pattern and detecting the position of the slide block 105*b*, the position of the parking rod 26 is detected.

Note that each of the components used for switching between the locked state and the unlocked state of the rotation of the power transmission shaft 23 of the automatic transmission 20, such as the parking gear 24, the parking pole 25, and the parking rod 26, may be an example of a "parking lock mechanism" in the present disclosure. Moreover, the actuator 27 which moves the parking rod 26 between the locked position and the unlocked position may be an example of a "parking drive mechanism" in the present disclosure. Moreover, each of the stop 35, the stop biasing spring 39, and the solenoid 40 may be an example of a "regulating mechanism" in the present disclosure.

<Structure of Hydraulic Pressure Control Valve>

Figure 5:
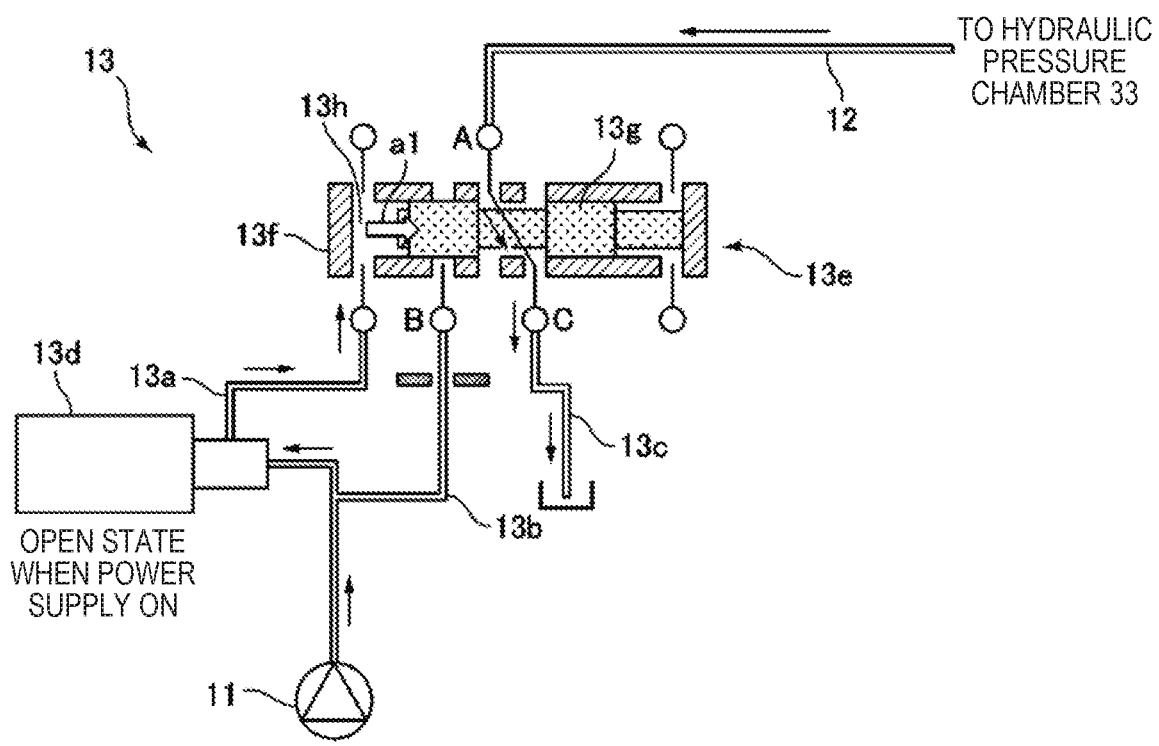
FIG. 5 is a partial cross-sectional view schematically illustrating a hydraulic pressure control valve at the locked state in this embodiment of the present disclosure.

Next, a concrete structure of the hydraulic pressure control valve according to this embodiment of the present disclosure is described with reference to FIGS. 5 and 6. FIG. 5 is a partial cross-sectional view schematically illustrating the hydraulic pressure control valve at the locked state, and FIG. 6 is a partial cross-sectional view schematically illustrating the hydraulic pressure control valve at the unlocked state.

Figure 6:
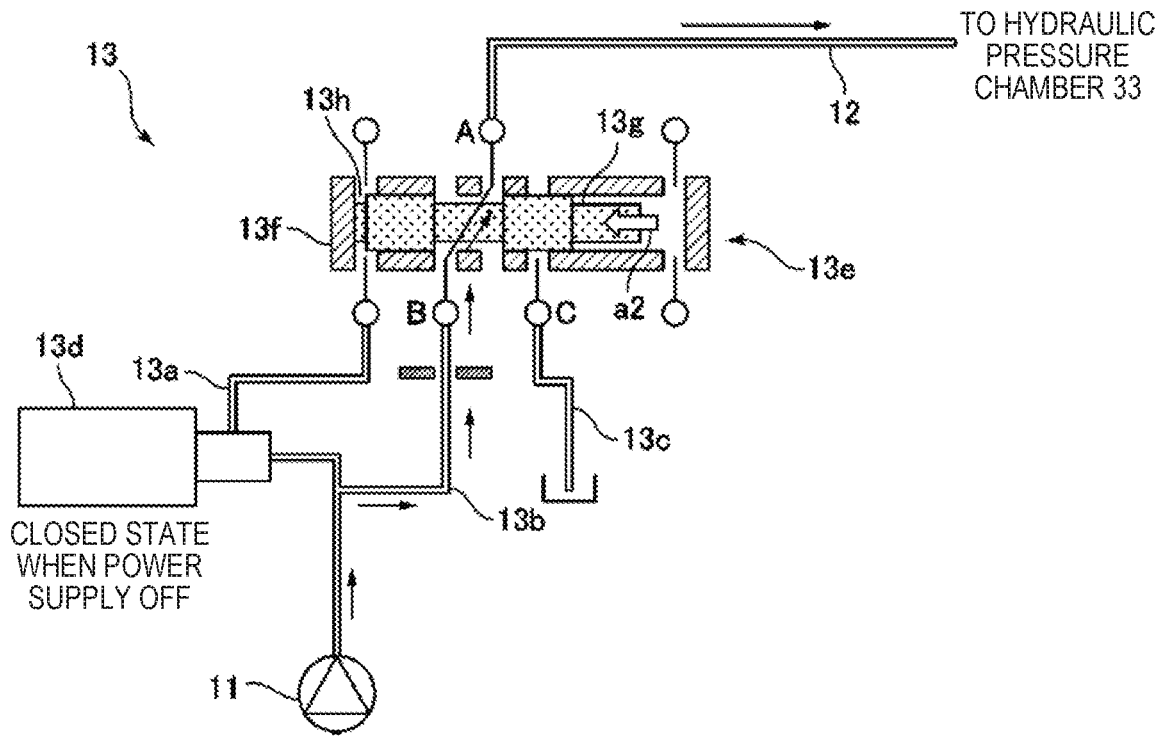
FIG. 6 is a partial cross-sectional view schematically illustrating the hydraulic pressure control valve at the unlocked state in this embodiment of the present disclosure.

As illustrated in FIGS. 5 and 6, the hydraulic pressure control valve 13 is provided between the oil pump 11 which is driven by the engine 10 and the oil passage 12 connected to the hydraulic pressure chamber 33 inside the actuator 27 (also see FIGS. 2 and 3). In detail, the hydraulic pressure control valve 13 has oil passages 13*a* and 1*b* as selectively-used oil supply routes, an oil passage 13*c* for discharging (draining) oil, a solenoid valve (electromagnetic valve) 13*d* as an on-off valve which opens when power is supplied and closes when power is not supplied, and a shift valve 13*e* which is operated by hydraulic pressure from the solenoid valve 13*d*. Moreover, the shift valve 13*e* mainly has a case 13*f* provided with a plurality of ports (representatively, ports A, B, and C), a valve body 13*g* accommodated movably inside the case 13*f*, and a hydraulic pressure chamber 13*h* to which oil for moving the valve body 13*g* is supplied.

First, in the locked state of the parking device 21, as illustrated in FIG. 5 (also see FIG. 2), the hydraulic pressure control valve 13 becomes in an open state by supplying power to the solenoid valve 13*d* so that oil is supplied to the shift valve 13*e* through the oil passage 13*a*. Therefore, oil is supplied to the hydraulic pressure chamber 13*h* of the shift valve 13*e* and the hydraulic pressure is given to the valve body 13*g* of the shift valve 13*e* to move the valve body 13*g* as illustrated by an arrow a1. In this case, in the shift valve 13*e*, the port B is closed by the valve body 13*g*, and the port A and the port C communicate with each other. Therefore, the supply of oil from the oil pump 11 to the hydraulic pressure chamber 33 inside the actuator 27 is intercepted by the shift valve 13*e*, that is, the hydraulic pressure is no longer given to the hydraulic pressure chamber 33. As a result, the parking rod 26 is biased by the rod biasing spring 34 inside the actuator 27 and is set at the locked position (see FIG. 2). Moreover, while the hydraulic pressure is given to the hydraulic pressure chamber 33, when switched to the state illustrated in FIG. 5 (i.e., when switched from the unlocked state to the locked state), the oil inside the hydraulic pressure chamber 33 is discharged through the port A and the port C of the shift valve 13*e*, and the oil passage 13*c*.

Next, in the unlocked state of the parking device 21, as illustrated in FIG. 6 (also see FIG. 3), in the hydraulic pressure control valve 13, the solenoid valve 13*d* becomes in the closed state when power is not supplied, and oil is supplied to the shift valve 13*e* through the oil passage 13*b*. In this case, since oil is not supplied to the hydraulic pressure chamber 13*h* of the shift valve 13*e*, the valve body 13*g* of the shift valve 13*e* moves as illustrated by an arrow a2. As a result, in the shift valve 13*e*, the port C is closed by the valve body 13*g*, and the port A and the port B communicate with each other. Therefore, the oil from the oil pump 11 is supplied to the hydraulic pressure chamber 33 inside the actuator 27 through the oil passage 1*b* and the port A and the port B of the shift valve 13*e*, that is, the hydraulic pressure is given to the hydraulic pressure chamber 33. Therefore, the parking rod 26 is set at the unlocked position by the hydraulic pressure given to the hydraulic pressure chamber 33 of the actuator 27 (see FIG. 3).

<Control Configuration>

Figure 7:
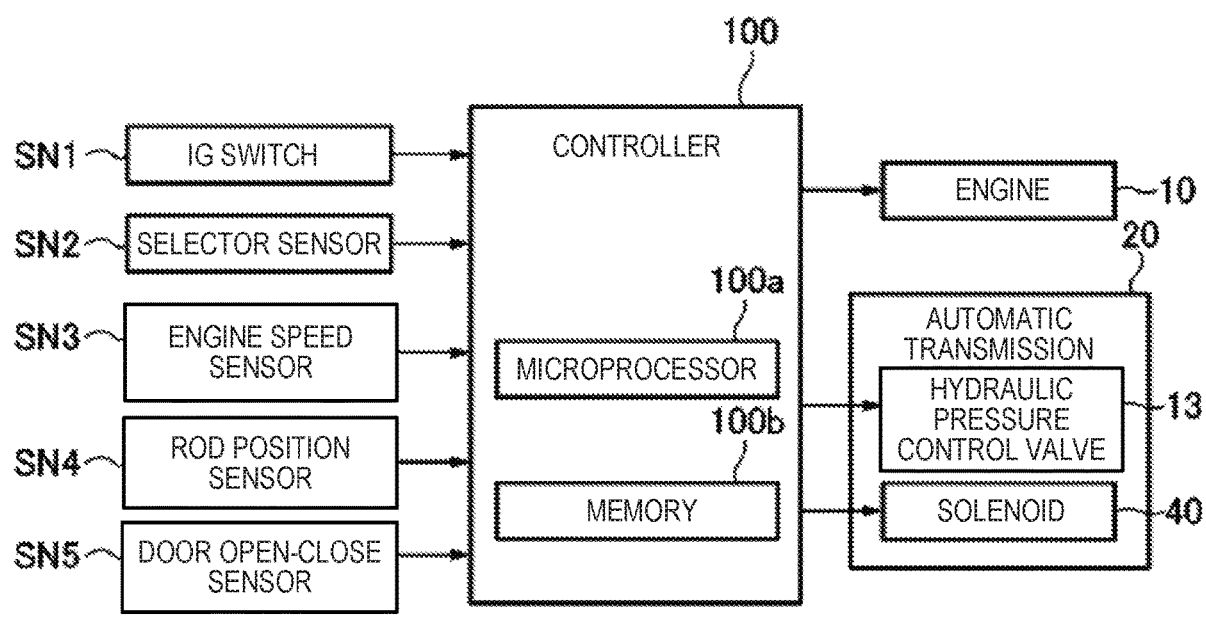
FIG. 7 is a block diagram illustrating an electric configuration of the control device for the automatic transmission according to this embodiment of the present disclosure.

Next, a control configuration of the control device for the automatic transmission according to this embodiment of the present disclosure is described with reference to FIG. 7. FIG. 7 is a block diagram illustrating an electric configuration of the control device for the automatic transmission.

As illustrated in FIG. 7, a signal from an IG (ignition) switch SN1 for turning ON/OFF the power of the vehicle 1, a signal from the selector sensor SN2 which detects the shift range selected by the operation of the shift lever 50, a signal from an engine speed sensor SN3 which detects an engine speed of the engine 10, a signal from the rod position sensor SN4 which detects the position of the parking rod 26 inside the parking device 21, and a signal from a door opening-and-closing sensor SN5 which detects opening/closing of a door of the vehicle 1 (particularly, a driver's seat door) are inputted into the controller 100.

The controller 100 is comprised of a circuitry, and is a controller based on a well-known microcomputer. The controller 100 includes one or more microprocessors 100*a*, as central processing units (CPU), which execute program(s), memory 100*b* which is comprised of, for example, RAM (Random Access Memory) and ROM (Read Only Memory) and stores the program(s) and data, and an I/O bus which inputs and outputs electrical signal(s). For example, the controller 100 is comprised of an ECU (Electronic Control Unit) and a TCM (Transmission Control Module).

In detail, as illustrated in FIG. 7, the controller 100 mainly outputs a control signal to the engine 10 and the automatic transmission 20 based on the signals from the switch SN1 and the sensors SN2-SN5, and controls the engine 10 and the automatic transmission 20. Particularly, in this embodiment, the controller 100 controls the engine speed of the engine 10 and performs a power control to the hydraulic pressure control valve 13 inside the parking device 21 of the automatic transmission 20 and the solenoid 40 which drives the stop 35. Note that, strictly, although the controller 100 performs the control to the solenoid valve 13*d* (FIGS. 5 and 6) of the hydraulic pressure control valve 13, controlling of the solenoid valve 13*d* of the hydraulic pressure control valve 13 may simply be described as controlling of the hydraulic pressure control valve 13 while omitting the solenoid valve 13*d,* for simplifying the description.

<Control of First Embodiment>

Next, a control executed by the controller 100 in the first embodiment of the present disclosure is described.

First, in the first embodiment, a control executed by the controller 100 when the power of the vehicle 1 is turned OFF (i.e., when the IG switch SN1 is turned OFF) is described. In the first embodiment, when the parking rod 26 is at the locked position (i.e., when the movement of the parking rod 26 is regulated by the stop 35 engaging with the first engagement groove 36), the controller 100 maintains the supply of power to the hydraulic pressure control valve 13, in other words, it supplies the power to the hydraulic pressure control valve 13 as the on-off valve to maintain the ON state of the hydraulic pressure control valve 13, while the engine speed of the engine 10 is higher than a given value, after the power of the vehicle 1 is turned OFF. That is, even after the power of the vehicle 1 is turned OFF, the controller 100 continues the supply of power to the hydraulic pressure control valve 13 while the engine speed of the engine 10 is higher than the given value, and after that, it suspends the supply of power to the hydraulic pressure control valve 13 when the engine speed of the engine 10 becomes the given value or below.

The reason why doing this is as follows. Since the supply of power to the hydraulic pressure control valve 13 is suspended when the power of the vehicle 1 is turned OFF, it becomes in a state where the oil from the oil pump 11 can be supplied to the hydraulic pressure chamber 33 of the actuator 27 (see FIG. 6). Fundamentally, since the engine speed is fully lowered when the power of the vehicle 1 is turned OFF, the hydraulic pressure is often not given to the actuator 27. However, after the power of the vehicle 1 is turned OFF, the engine speed may be comparatively high for a while, and in this case, the hydraulic pressure is given to the actuator 27. Thus, the hydraulic pressure acts to move the parking rod 26, in the state where the movement is regulated by the stop 35 engaging with the first engagement groove 36 (see FIG. 2), from the locked position to the unlocked position. Therefore, the stop 35 collides the wall which forms the first engagement groove 36 (in this case, a backlash between the stop 35 and the first engagement groove 36 is eliminated), and the stop 35 and the first engagement groove 36 may be damaged.

Therefore, in the first embodiment, when the parking rod 26 is at the locked position, after the power of the vehicle 1 is turned OFF, the controller 100 maintains the supply of power to the hydraulic pressure control valve 13 while the engine speed of the engine 10 is higher than the given value so as not to give the hydraulic pressure to the actuator 27 (see FIG. 5). Therefore, the movement of the parking rod 26 caused by the hydraulic pressure in the actuator 27 can be reduced, and the collision of the stop 35 with the first engagement groove 36 can be prevented. As a result, it becomes possible to prevent damage to the stop 35 and the first engagement groove 36.

Figure 8:
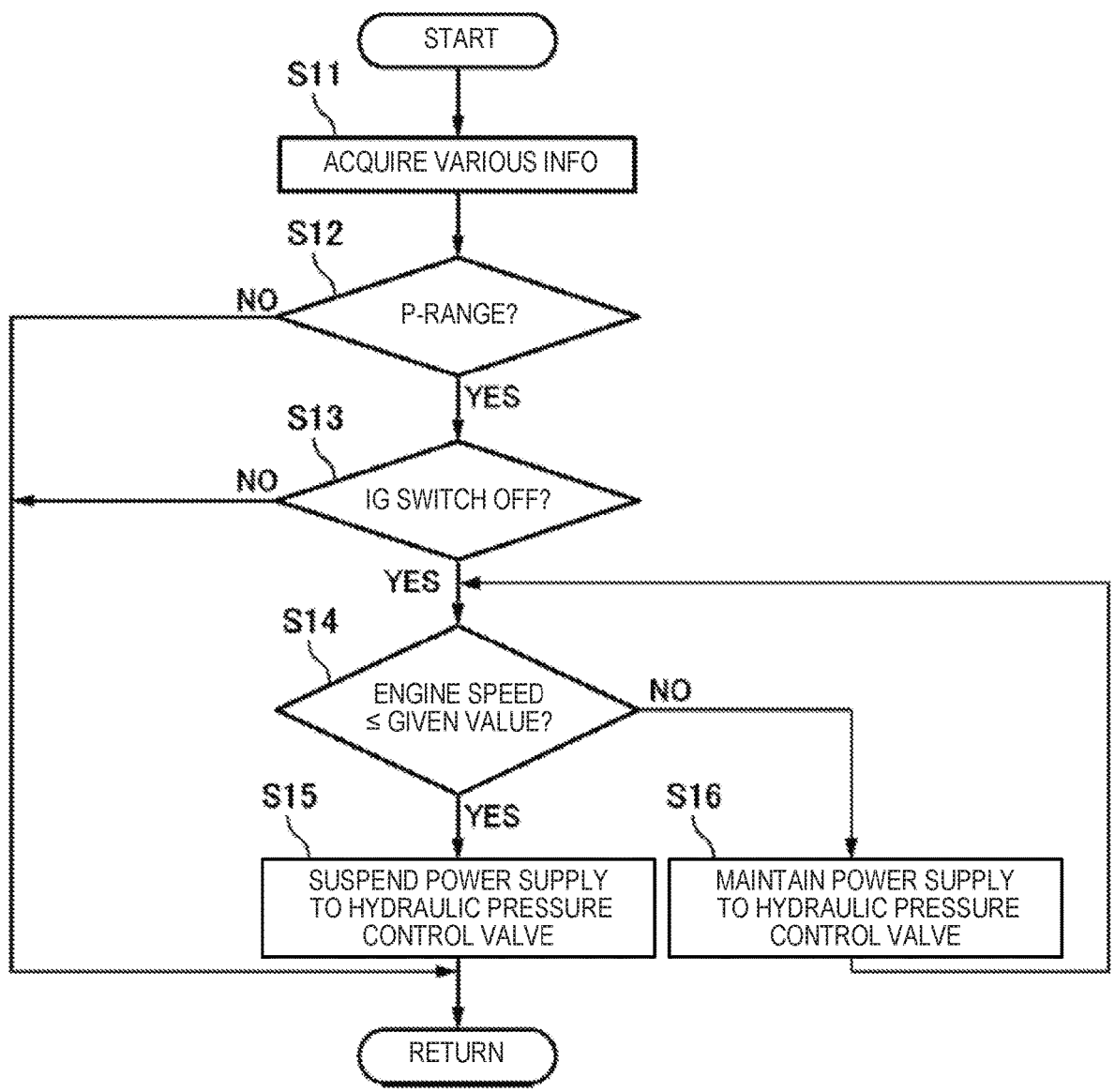
FIG. 8 is a flowchart illustrating a control when switching power of the vehicle from ON to OFF in a first embodiment of the present disclosure.

Next, a control when switching the power of the vehicle 1 from ON to OFF in the first embodiment of the present disclosure is described concretely with reference to FIG. 8. FIG. 8 is a flowchart illustrating a control when switching the power of the vehicle 1 from ON to OFF. This control is repeatedly executed at a given interval by the microprocessor 100*a* in the controller 100 based on the program stored in the memory 100*b.*

First, at Step S11, the controller 100 acquires variety of information corresponding to the signals from the switch SN1 and the sensors SN2-SN5. Particularly, the controller 100 acquires a state of the IG switch SN1, i.e., ON/OFF of the IG switch SN1 (this corresponds to the power ON/OFF of the vehicle 1), the shift range detected by the selector sensor SN2, and the engine speed detected by the engine speed sensor SN3. Then, the controller 100 shifts to Step S12.

Next, at Step S12, the controller 100 determines whether the shift range acquired at Step S11 is the P-range. This determination corresponds to a determination of whether the parking rod 26 is at the locked position. As a result, if determined that the shift range is the P-range (Step S12: YES), the controller 100 shifts to Step S13. At Step S13, the controller 100 determines whether the state of the IG switch SN1 acquired at Step S11 is OFF. As a result, if determined that the IG switch SN1 is OFF (Step S13: YES), that is, if the power of the vehicle 1 is turned OFF, the controller 100 shifts to Step S14.

On the other hand, at Step S12, if determined that the shift range is not the P-range (Step S12: NO), that is, if the shift range is the Non-P-range, the controller 100 exits from the routine according to this control. Moreover, at Step S13, if determined that the IG switch SN1 is not OFF (Step S13: NO), that is, if the power of the vehicle 1 stays ON, the controller 100 exits from the routine according to this control. This is because the situation where the shift range is the Non-P-range or the IG switch SN1 is ON does not correspond to the condition to execute the control.

Note that although in the above example it is determined whether the shift range is the P-range (Step S12), it may be determined whether the parking rod 26 is at the locked position based on the position of the parking rod 26 detected by the rod position sensor SN4.

Next, at Step S14, the controller 100 determines whether the engine speed acquired at Step S11 is the given value or below. The given value used for this determination adopts an engine speed at which the hydraulic pressure for moving the parking rod 26 is not generated in the actuator 27, in more detail, the hydraulic pressure larger than the biasing force of the rod biasing spring 34 inside the actuator 27 is not generated. In a suitable example, a value near zero (rpm) is applied to the given value. In one example, zero (rpm) is applied to the given value. According to this example, it can certainly prevent the collision of the stop 35 with the first engagement groove 36 which occurs by the movement of the parking rod 26.

As a result of Step S14, if determined that the engine speed is not the given value or below (Step S14: NO), that is, if the engine speed is higher than the given value, the controller 100 shifts to Step S16. In this case, the engine 10 may be possible to generate the hydraulic pressure for moving the parking rod 26. Therefore, at Step S16, the controller 100 maintains the supply of power to the hydraulic pressure control valve 13 in order to intercept the supply of hydraulic pressure from the oil pump 11 of the engine 10 to the actuator 27 and prevent the movement of the parking rod 26 to the unlock side. In more detail, the controller 100 continues the supply of power to the solenoid valve 13d and maintains the ON state of the valve 13d in order to maintain the solenoid valve 13d of the hydraulic pressure control valve 13 in the open state and maintain the state of the shift valve 13e as illustrated in FIG. 5 (i.e., a state where the oil path from the oil pump 11 to the hydraulic pressure chamber 33 of the actuator 27 is intercepted).

After Step S16, the controller 100 returns to Step S14 and then again performs the determination at Step S14. Thus, while the engine speed is higher than the given value (Step S14: NO), the controller 100 continues the supply of power to the hydraulic pressure control valve 13 (Step S16).

On the other hand, as a result of Step S14, if determined that the engine speed is the given value or below (Step S14: YES), the controller 100 shifts to Step S15. In this case, the engine 10 is not in a state where it can generate the hydraulic pressure for moving the parking rod 26. Therefore, at Step S15, the controller 100 also suspends the supply of power to the hydraulic pressure control valve 13 according to the IG switch SN1 being turned OFF, as usual. That is, the controller 100 turns OFF the supply of power to the solenoid valve 13d of the hydraulic pressure control valve 13. Then, the controller 100 exits from the routine according to this control.

Note that as described above, the controller 100 operates, also when the IG switch SN1 is OFF (i.e., if the power of the vehicle 1 is OFF). Normally, since the TCM included in the controller 100 can operate also when the IG switch SN1 is OFF, the control described above may be executed mainly by this TCM, for example (similar for controls described later).

Figure 9:
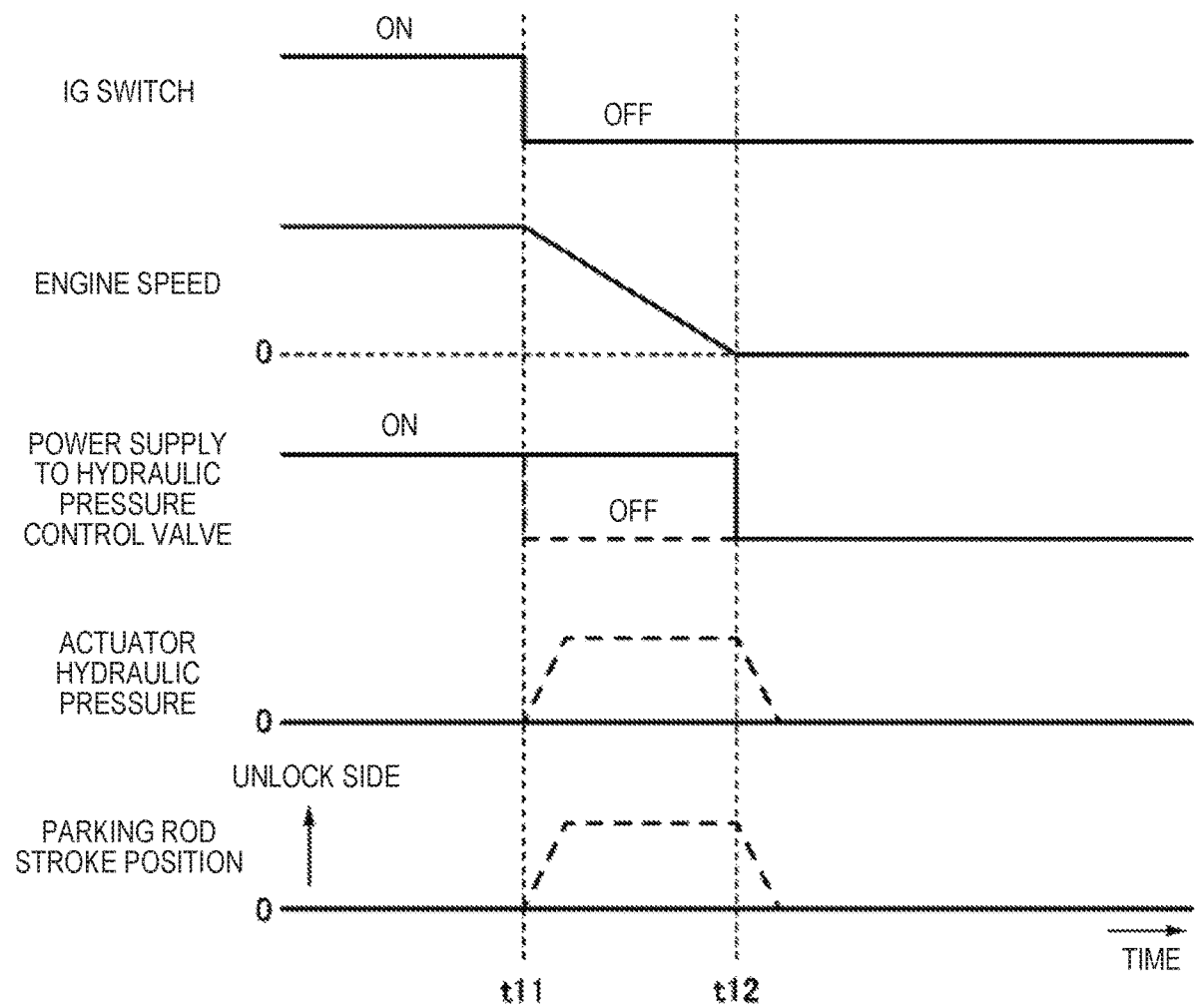
FIG. 9 is a time chart illustrating a result of the control when switching the power of the vehicle from ON to OFF in the first embodiment of the present disclosure.

Next, operation and effects by the control when switching the power of the vehicle 1 from ON to OFF in the first embodiment of the present disclosure is described with reference to FIG. 9. FIG. 9 is a time chart illustrating a result of the control when switching the power of the vehicle 1 from ON to OFF.

FIG. 9 illustrates, sequentially from the top, the state (ON/OFF) of the IG switch SN1, the engine speed, the power supply state (ON/OFF) of the hydraulic pressure control valve 13, the hydraulic pressure given to the actuator 27, and the stroke position of the parking rod 26 on the basis of the locked position. Moreover, in FIG. 9, a solid line graph illustrates a result of the control according to the first embodiment, and a broken line graph illustrates a result of a control according to a comparative example.

First, in the comparative example, when the IG switch SN1 is turned OFF (time t11), the supply of power to the hydraulic pressure control valve 13 is turned OFF. In the example illustrated in FIG. 9, since the engine speed is comparatively high even after the IG switch SN1 is turned OFF, the hydraulic pressure is given from the oil pump 11 to the actuator 27 when the supply of power to the hydraulic pressure control valve 13 is turned OFF. Thus, by the hydraulic pressure given to the actuator 27, the parking rod 26 moves to the unlock side by the amount of backlash between the stop 35 and the first engagement groove 36, and the stop 35 collides the first engagement groove 36.

On the other hand, in the first embodiment, even after time t11 at which the IG switch SN1 is turned OFF, the supply of power to the hydraulic pressure control valve 13 is maintained ON. Therefore, the hydraulic pressure is not given from the oil pump 11 to the actuator 27, and the movement of the parking rod 26 by the hydraulic pressure is prevented. As a result, the collision of the stop 35 with the first engagement groove 36 can be prevented. Moreover, in the first embodiment, while the engine speed is higher than the given value (zero in the example illustrated in FIG. 9) (time t11-t12), the supply of power to the hydraulic pressure control valve 13 is continued, and after the engine speed becomes the given value or below (after time t12), the supply of power to the hydraulic pressure control valve 13 is suspended. Thus, by suspending the supply of power to the hydraulic pressure control valve 13 when the engine speed becomes the given value or below, the power consumption for supplying the power to the hydraulic pressure control valve 13 can appropriately be reduced.

Next, in the first embodiment, a control executed by the controller 100 when the power of the vehicle 1 is turned ON (i.e., when the IG switch SN1 is turned ON) is described. In the first embodiment, while the power of the vehicle 1 is OFF, the controller 100 starts the supply of power to the hydraulic pressure control valve 13 before the power of the vehicle 1 is turned ON. Particularly, while the power of the vehicle 1 is OFF, the controller 100 starts the supply of power to the hydraulic pressure control valve 13 when the door of the vehicle 1 is opened. Note that, in order to achieve such a control according to the first embodiment, while the power of the vehicle 1 is OFF, the controller 100 must be in an active state where it is possible to give the power supply command to the hydraulic pressure control valve 13.

The reason for performing the control is as follows. When the power of the vehicle 1 is turned ON, although the supply of power to the hydraulic pressure control valve 13 is started, the hydraulic pressure control valve 13 may not promptly intercept the supply of hydraulic pressure to the actuator 27. This originates, for example, from a time lag from the power supply command being issued from the controller 100 to the power being actually supplied to the solenoid valve 13d of the hydraulic pressure control valve 13, a time lag from the power being supplied to the solenoid valve 13d being actually opened, and a time lag from the solenoid valve 13d being opened to the shift valve 13e being actually operated. On the other hand, after the power of the vehicle 1 is turned ON, the engine speed may rise immediately. In this case, if the hydraulic pressure control valve 13 does not promptly intercept the supply of hydraulic pressure to the actuator 27, the hydraulic pressure is given to the actuator 27. Thus, the hydraulic pressure acts for moving, from the locked position to the unlocked position, the parking rod 26 of which the movement is regulated by the stop 35 engaging with the first engagement groove 36 (see FIG. 2), and the stop 35 collides the wall which forms the first engagement groove 36 (in this case, the backlash between the stop 35 and the first engagement groove 36 is eliminated). Therefore, the stop 35 and the first engagement groove 36 may be damaged.

Therefore, in the first embodiment, the controller 100 starts the supply of power to the hydraulic pressure control valve 13, while the power of the vehicle 1 is OFF before the power is turned ON. Particularly, in the first embodiment, when the door (particularly, the driver's seat door) is opened while the power of the vehicle 1 is OFF, it is considered that the power will be turned ON immediately after that, and therefore, the supply of power to the hydraulic pressure control valve 13 is started. Thus, when the power of the vehicle 1 is turned ON, the supply of power to the hydraulic pressure control valve 13 is completed and the hydraulic pressure control valve 13 is set to be able to intercept the supply of hydraulic pressure to the actuator 27 certainly (see FIG. 5). Therefore, the movement of the parking rod 26 caused by the hydraulic pressure in the actuator 27 can be prevented, and the collision of the stop 35 with the first engagement groove 36 can be prevented. Thus, it becomes possible to prevent damage to the stop 35 and the first engagement groove 36.

Figure 10:
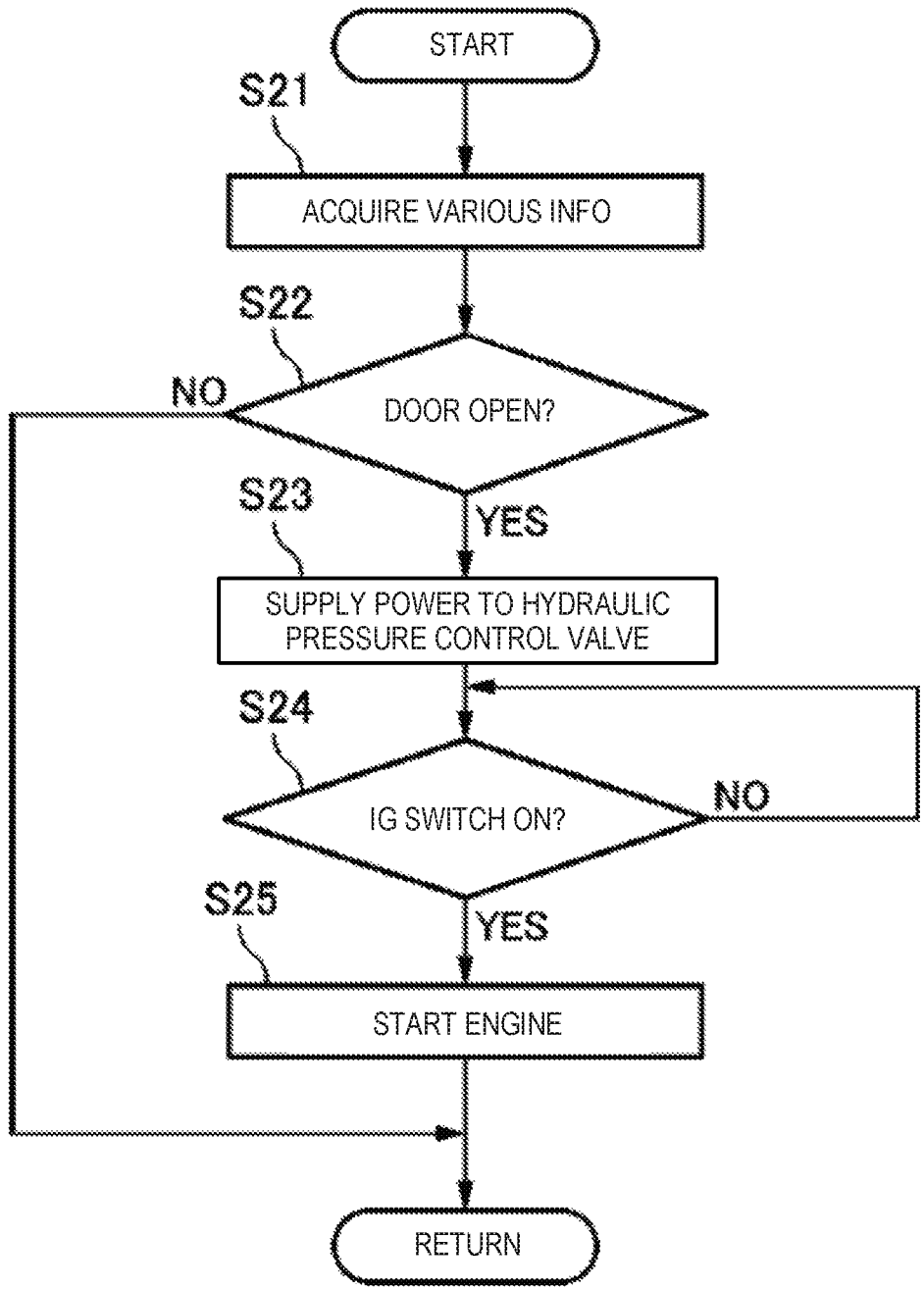
FIG. 10 is a flowchart illustrating a control when switching the power of the vehicle from OFF to ON in the first embodiment of the present disclosure.

Next, a control when switching the power of the vehicle 1 from OFF to ON in the first embodiment of the present disclosure is described concretely with reference to FIG. 10. FIG. 10 is a flowchart illustrating the control when switching the power of the vehicle 1 from OFF to ON. This control is also repeatedly executed at a given interval by the microprocessor 100a in the controller 100 based on the program stored in the memory 100b.

First, at Step S21, the controller 100 acquires variety of information corresponding to the signals from the switch SN1 and the sensors SN2-SN5. Particularly, the controller 100 acquires the state of the IG switch SN1, i.e., ON/OFF of the IG switch SN1 (this corresponds to the power ON/OFF of the vehicle 1), and the open/close state of the door of the vehicle 1 detected by the door opening-and-closing sensor SN5. Then, the controller 100 shifts to Step S22.

Next, at Step S22, the controller 100 determines whether the door of the vehicle 1 is opened based on the open/close state of the door acquired at Step S21. As a result, if determined that the door of the vehicle 1 is opened (Step S22: YES), the controller 100 shifts to Step S23. On the other hand, if determined that the door of the vehicle 1 is not opened (i.e., if the door of the vehicle 1 is closed) (Step S22: NO), the controller 100 exits from the routine according to this control. Note that at the Step S22, particularly, it is desirable to determine whether the door of the driver's seat is opened. This is because, if the door of the driver's seat is opened, the possibility that the IG switch SN1 will then be immediately turned ON is high.

Next, at Step S23, the controller 100 determines that, since the door of the vehicle 1 is opened, the possibility that the IG switch SN1 will then be immediately turned ON is high, and it starts the supply of power to the hydraulic pressure control valve 13 so that the supply of power to the hydraulic pressure control valve 13 is completed when the IG switch SN1 is turned ON. Thus, when the IG switch SN1 is turned ON, the hydraulic pressure control valve 13 is certainly set in the state where it can intercept the supply of hydraulic pressure to the actuator 27 to prevent the movement of the parking rod 26 to the unlock side. In more detail, the controller 100 opens the solenoid valve 13d of the hydraulic pressure control valve 13, and starts the supply of power to the solenoid valve 13d so that the shift valve 13e becomes in the state as illustrated in FIG. 5 (i.e., the state where the oil path from the oil pump 11 to the hydraulic pressure chamber 33 of the actuator 27 is intercepted).

Next, at Step S24, the controller 100 determines whether the state of the IG switch SN1 acquired at Step S21 is ON. As a result, if determined that the IG switch SN1 is ON (i.e., if the power of the vehicle 1 is turned ON) (Step S24: YES), the controller 100 shifts to Step S25 to start the engine 10. For example, the controller 100 rotates a flywheel by using a starter motor to start the engine 10. Then, the controller 100 exits from the routine according to this control.

On the other hand, if determined that the IG switch SN1 is not ON (i.e., if the power of the vehicle 1 stays OFF) (Step S24: NO), the controller 100 returns to Step S24 to again perform the determination of Step S24. In this case, the controller 100 stands by until the IG switch SN1 is turned ON. Note that after starting the supply of power to the hydraulic pressure control valve 13, even if the IG switch SN1 is not turned ON for a given period of time, the supply of power to the hydraulic pressure control valve 13 may be suspended in order to reduce the power consumption.

Figure 11:
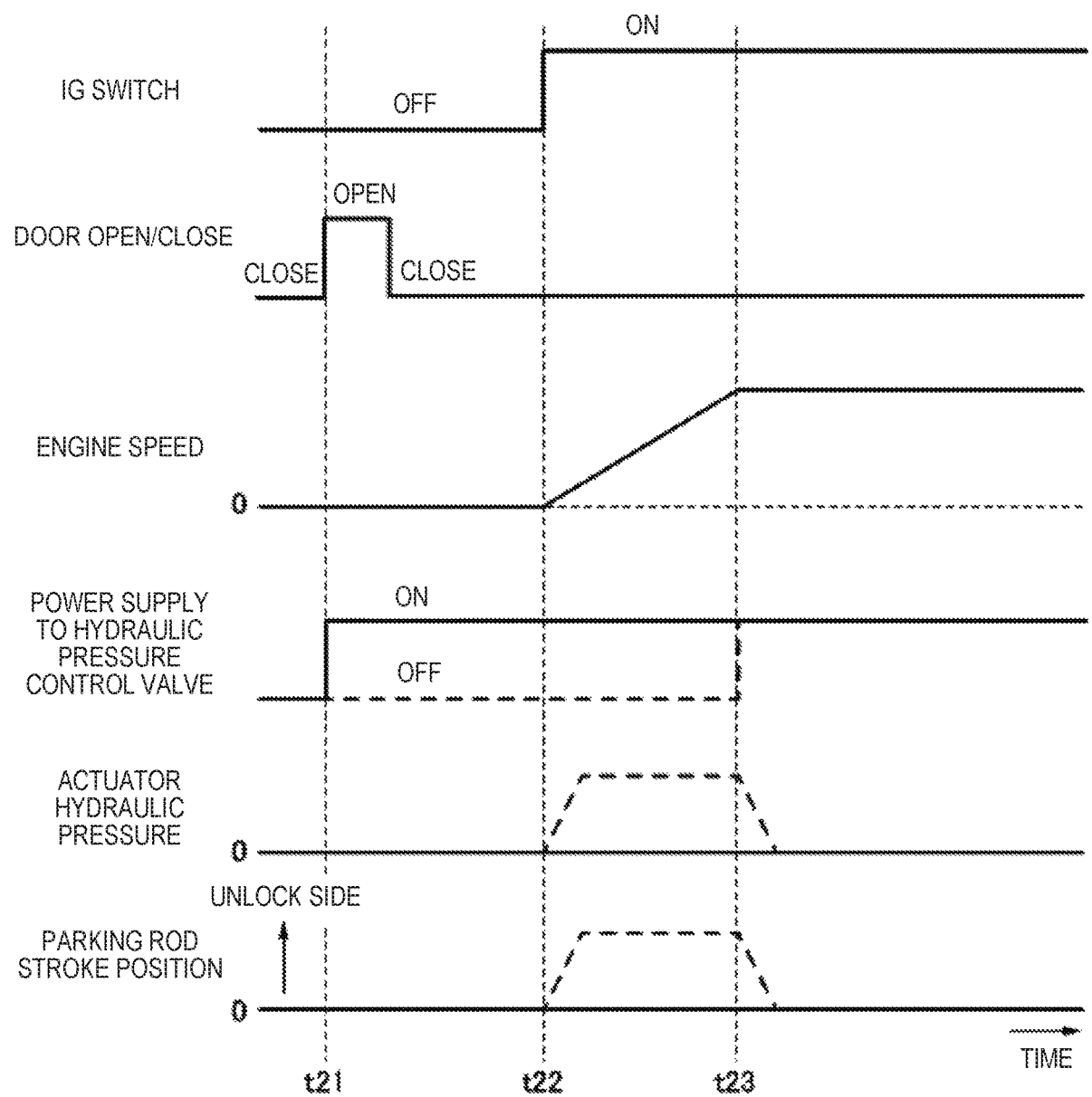
FIG. 11 is a time chart illustrating a result of the control when switching the power of the vehicle from OFF to ON in the first embodiment of the present disclosure.

Next, operation and effects by the control when switching the power of the vehicle 1 from OFF to ON in the first embodiment of the present disclosure is described with reference to FIG. 11. FIG. 11 is a time chart illustrating a result of the control when switching the power of the vehicle 1 from OFF to ON.

FIG. 11 illustrates, sequentially from the top, the state of the IG switch SN1 (ON/OFF), the open/close state of the door of the vehicle 1, the engine speed, the power supply state (ON/OFF) of the hydraulic pressure control valve 13, and the hydraulic pressure given to the actuator 27, and the stroke position of the parking rod 26 on the basis of the locked position. Moreover, in FIG. 11, a solid line graph illustrates a result of the control according to the first embodiment described above, and a broken line graph illustrates a result of the control according to the comparative example.

First, in the comparative example, when a certain period of time is elapsed after the IG switch SN1 is turned ON at time t22, the supply of power to the hydraulic pressure control valve 13 is turned ON at time t23. In the example illustrated in FIG. 11, the engine speed rises quickly immediately after the IG switch SN1 is turned ON. Therefore, since the supply of power to the hydraulic pressure control valve 13 is OFF at least during a period from time t22 to time t23, the hydraulic pressure is given from the oil pump 11 to the actuator 27. Thus, by the hydraulic pressure given to the actuator 27, the parking rod 26 moves to the unlock side by the amount of backlash between the stop 35 and the first engagement groove 36, and therefore, the stop 35 collides the first engagement groove 36.

On the other hand, in the first embodiment, when the door of the vehicle 1 is opened (time t21) before the IG switch SN1 is turned ON, the supply of power to the hydraulic pressure control valve 13 is started, that is, the supply of power to the hydraulic pressure control valve 13 is turned ON. Thus, since the supply of power to the hydraulic pressure control valve 13 is completed when the IG switch SN1 is turned ON next (time t22), the hydraulic pressure is not given from the oil pump 11 of the engine 10 to the actuator 27, and therefore, the movement of the parking rod 26 by the hydraulic pressure is prevented. As a result, the collision of the stop 35 with the first engagement groove 36 can be prevented. Moreover, in the first embodiment, since the supply of power to the hydraulic pressure control valve 13 is started at the timing when the door is opened while the IG switch SN1 is OFF, at which the possibility that the IG switch SN1 is turned ON is high, the power consumption for supplying the power to the hydraulic pressure control valve 13 can appropriately be reduced.

Note that although in the embodiment the timing at which the supply of power to the hydraulic pressure control valve 13 is started while the power of the vehicle 1 is OFF is the timing at which the door of the vehicle 1 is opened, the present disclosure is not limited to this configuration. In another example, while the power of the vehicle 1 is OFF, the supply of power to the hydraulic pressure control valve 13 may be started at a timing when the door of the vehicle 1 is closed after the door is once opened. In another example, while the power of the vehicle 1 is OFF, the supply of power to the hydraulic pressure control valve 13 may be started at a timing when a seat sensor provided to the driver's seat detects the driver sitting down.

<Control of Second Embodiment>

Next, a control executed by the controller 100 in the second embodiment of the present disclosure is described.

The control according to the second embodiment relates to a control performed when the power of the vehicle 1 is turned ON. Also in the first embodiment, the control described above is performed when the power of the vehicle 1 is turned ON. That is, in the first embodiment, the controller 100 performs the control for starting the supply of power to the hydraulic pressure control valve 13 while the power of the vehicle 1 is OFF, before the power of the vehicle 1 is turned ON. In the second embodiment, although the control is performed based on a similar reason to the control according to this first embodiment, the control is different from that of the first embodiment.

In detail, in the second embodiment, after the power of the vehicle 1 is turned ON, the controller 100 performs a control for inhibiting an increase in the engine speed for a given period of time from an issuance of the power supply command to the hydraulic pressure control valve 13. Thus, after the power of the vehicle 1 is turned ON, the generation of the hydraulic pressure by the engine 10 is prevented until the hydraulic pressure control valve 13 becomes able to intercept the supply of hydraulic pressure to the actuator 27 so as not to give the hydraulic pressure to the actuator 27. Therefore, the movement of the parking rod 26 caused by the hydraulic pressure in the actuator 27 can be prevented so as to avoid the collision of the stop 35 with the first engagement groove 36. Thereby, it becomes possible to prevent damage to the stop 35 and the first engagement groove 36.

Figure 12:
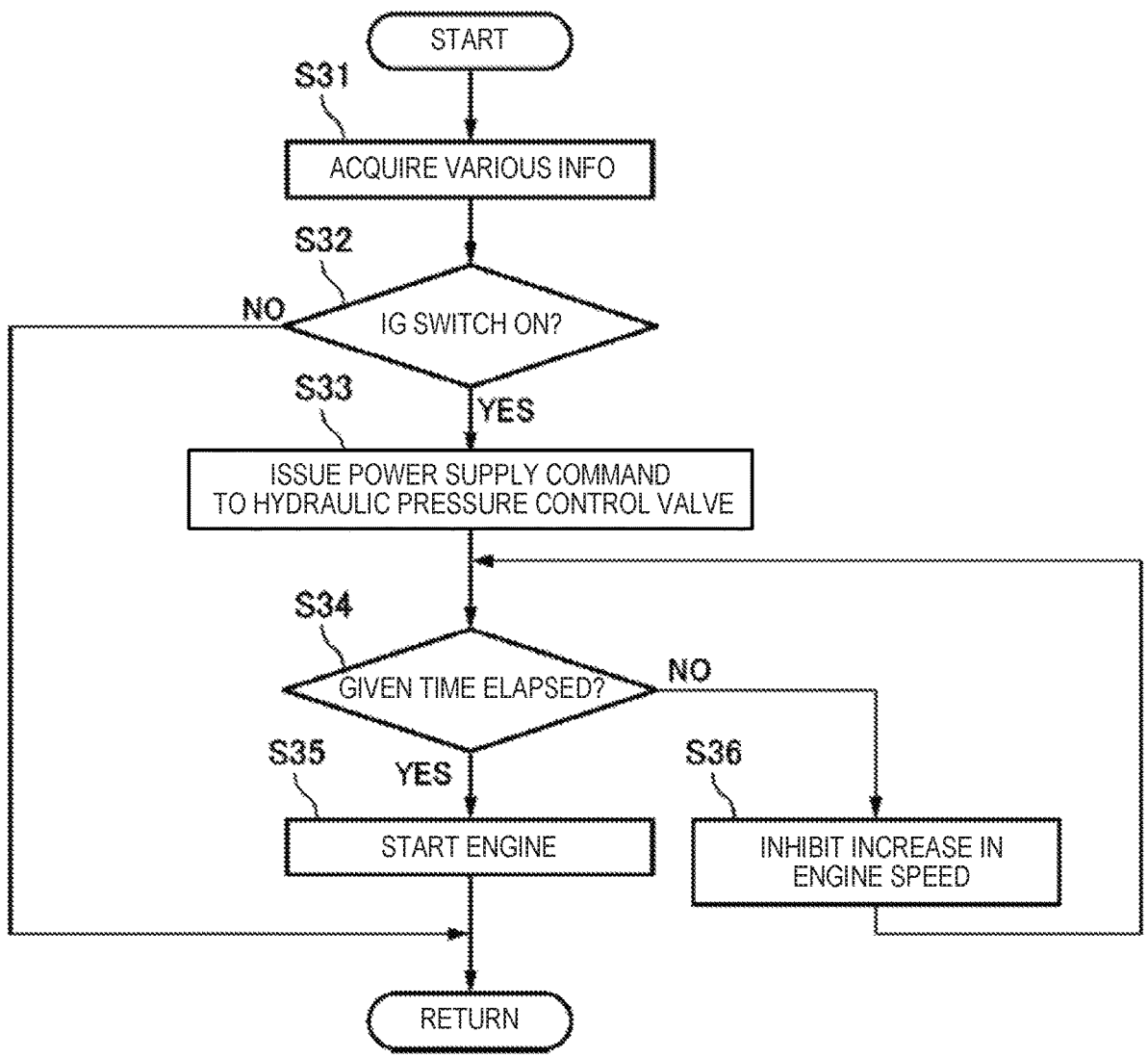
FIG. 12 is a flowchart illustrating a control when switching the power of the vehicle from OFF to ON in a second embodiment of the present disclosure.

Next, a control when switching the power of the vehicle 1 from OFF to ON in the second embodiment of the present disclosure is described concretely with reference to FIG. 12. FIG. 12 is a flowchart illustrating the control when switching the power of the vehicle 1 from OFF to ON. This control is also repeatedly executed at a given interval by the microprocessor 100a in the controller 100 based on the program stored in the memory 100b.

First, at Step S31, the controller 100 acquires a variety of information corresponding to the signals from the switch SN1 and the sensors SN2-SN5. Particularly, the controller 100 acquires the state of the IG switch SN1, i.e., ON/OFF of the IG switch SN1 (this corresponds to the power ON/OFF of the vehicle 1). Then, the controller 100 shifts to Step S32.

Next, at Step S32, the controller 100 determines whether the state of the IG switch SN1 acquired at Step S31 is ON. As a result, if determined that the IG switch SN1 is ON (i.e., if the power of the vehicle 1 is turned ON) (Step S32: YES), the controller 100 shifts to Step S33. On the other hand, if determined that the IG switch SN1 is not ON (i.e., if the power of the vehicle 1 stays OFF) (Step S32: NO), the controller 100 exits from the routine according to this control.

Next, at Step S33, the controller 100 issues the power supply command to the hydraulic pressure control valve 13 so that the hydraulic pressure control valve 13 becomes in the state where it can intercept the supply of hydraulic pressure to the actuator 27. Then, the controller 100 shifts to Step S34.

Next, at Step S34, the controller 100 determines whether the given period of time is elapsed after issuing the power supply command to the hydraulic pressure control valve 13. This given period of time is set in consideration of a time from the issuance of the power supply command to the power being actually supplied to the solenoid valve 13d of the hydraulic pressure control valve 13, a time from the power supply to the solenoid valve 13d being actually opened, a time from the solenoid valve 13d being opened to the shift valve 13e being actually operated, etc.

As a result of Step S34, if determined that the given period of time is not elapsed (Step S34: NO), the controller 100 shifts to Step S36. In this case, it is thought that the hydraulic pressure control valve 13 has not been able to intercept the supply of hydraulic pressure to the actuator 27. Therefore, at Step S36, the controller 100 inhibits the increase in the engine speed to prevent the generation of the hydraulic pressure by the engine 10 so that the hydraulic pressure is not to be given to the actuator 27. For example, the controller 100 stands by a startup of the engine 10 by the starter motor.

After Step S36, the controller 100 returns to Step S34 to again perform the determination of Step S34. Thus, until the given period of time is elapsed (Step S34: NO), the controller 100 continues inhibiting the rise of the engine speed (Step S36).

On the other hand, as a result of Step S34, if determined that the given period of time is elapsed (Step S34: YES), the controller 100 shifts to Step S35. In this case, it is thought that the hydraulic pressure control valve 13 becomes able to intercept the supply of hydraulic pressure to the actuator 27. Therefore, at Step S35, the controller 100 starts the engine 10 according to the IG switch SN1 being turned ON. For example, the controller 100 rotates the flywheel by the starter motor to start the engine 10. Then, the controller 100 exits from the routine according to this control.

Figure 13:
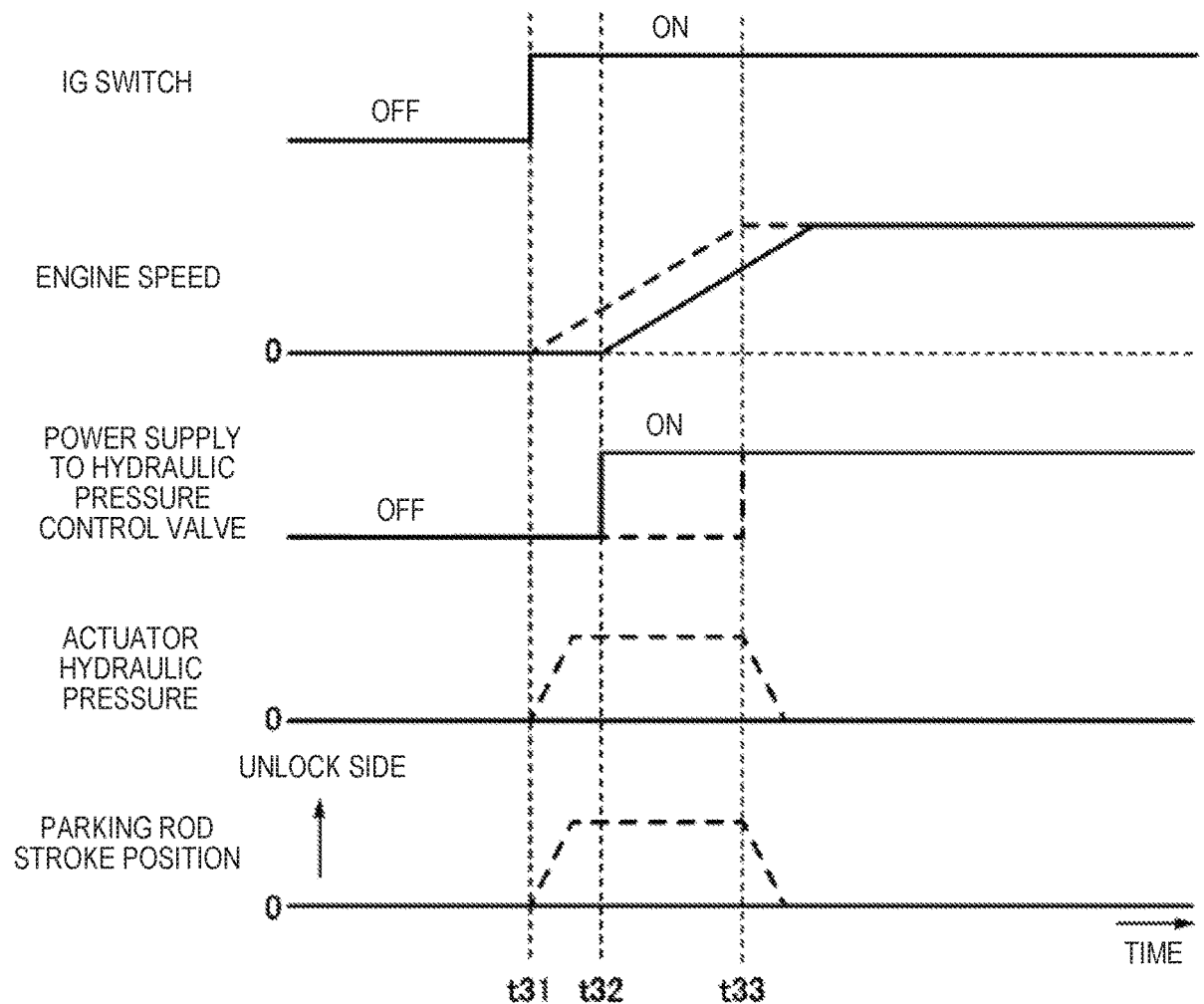
FIG. 13 is a time chart illustrating a result of the control when switching the power of the vehicle from OFF to ON in the second embodiment of the present disclosure.

Next, operation and effects by the control when switching the power of the vehicle 1 from OFF to ON in the second embodiment of the present disclosure is described with reference to FIG. 13. FIG. 13 is a time chart illustrating a result of the control when switching the power of the vehicle 1 from OFF to ON.

FIG. 13 illustrates, sequentially from the top, the state (ON/OFF) of the IG switch SN1, the engine speed, the power supply state (ON/OFF) of the hydraulic pressure control valve 13, the hydraulic pressure given to the actuator 27, and the stroke position of the parking rod 26 on the basis of the locked position. Moreover, in FIG. 13, a solid line graph illustrates a result of the control by the second embodiment described above, and a broken line graph illustrates a result of the control by the comparative example.

First, in the comparative example, when a certain period of time is elapsed after the IG switch SN1 is turned ON at time t31, the supply of power to the hydraulic pressure control valve 13 is turned ON at time t33. In the example illustrated in FIG. 13, the engine speed rises quickly immediately after the IG switch SN1 is turned ON. Therefore, at least during a period from time t31 to time t33, since the supply of power to the hydraulic pressure control valve 13 is OFF, the hydraulic pressure is given from the oil pump 11 to the actuator 27. Thus, the hydraulic pressure given to the actuator 27 moves the parking rod 26 to the unlock side by the amount of backlash between the stop 35 and the first engagement groove 36, and therefore, the stop 35 collides the first engagement groove 36.

On the other hand, in the second embodiment, the power supply command is issued to the hydraulic pressure control valve 13 at time t31 when the IG switch SN1 is turned ON. Then, until the given period of time is elapsed after power supply command is issued, in detail, a period from time t31 to time t32, the increase in the engine speed is inhibited, and therefore, the generation of the hydraulic pressure by the engine 10 is prevented. Therefore, the hydraulic pressure is not given to the actuator 27, and the movement of the parking rod 26 by the hydraulic pressure is prevented. As a result, the collision of the stop 35 with the first engagement groove 36 can be prevented.

Note that although in the embodiment the increase in the engine speed is inhibited until the given period of time is elapsed after the power supply command is issued to the hydraulic pressure control valve 13, after the power of the vehicle 1 is turned ON, the present disclosure is not limited to inhibiting the increase in the engine speed. In another example, instead of inhibiting the increase in the engine speed, the increase in the engine speed is reduced, while permitting the increase in the engine speed. For example, a rate of increase in the engine speed may be regulated, that is, a slope of the increase in the engine speed may be more gentle than usual.

<Modification>

In the above embodiments, the hydraulic pressure control valve 13 is comprised of the on-off valve which can take the two states of the open state (fully open) and the closed state (fully close) by switching between the "power supplied state" and the "power not supplied state." However, the present disclosure is not limited to the application to such an on-off valve, but it may also be applied to a valve which is adjustable of a valve opening by changing the amount of power supplied (current or voltage). In this case, while the engine speed is higher than a given value after the power of the vehicle 1 is turned OFF, the controller 100 may maintain a given amount of power (the amount of power supplied to achieve the state illustrated in FIG. 5) larger than zero to the hydraulic pressure control valve 13.

Moreover, in the above embodiments, the parking rod 26 is set at the unlocked position by using the hydraulic pressure from the oil pump 11 which is driven by the engine 10, in other words, by using the hydraulic pressure generated by the rotation of the engine 10. In another example, if the engine 10 is provided with a turbocharger, the hydraulic pressure may be generated by rotation of a turbine of the turbocharger, and the parking rod 26 may be set at the unlocked position by using the hydraulic pressure.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
10 Engine
11 Oil Pump
13 Hydraulic Pressure Control Valve
13d Solenoid Valve
13e Shift Valve
20 Automatic Transmission
21 Parking Device
23 Power Transmission Shaft
24 Parking Gear (Parking Lock Mechanism)
25 Parking Pole (Parking Lock Mechanism)
26 Parking Rod (Parking Lock Mechanism)
27 Actuator (Parking Drive Mechanism)
33 Hydraulic Pressure Chamber
34 Rod Biasing Spring
35 Stop (Regulating Mechanism)
36 First Engagement Groove
40 Solenoid
100 Controller
SN1 IG Switch
SN2 Selector Sensor
SN5 Door Opening-and-closing Sensor

What is claimed is:

1. A control device for an automatic transmission, comprising:

a parking lock mechanism, provided with a parking rod, configured to lock rotation of a power transmission shaft of the automatic transmission by setting the parking rod at a locked position on one side in an axial direction of the parking rod, when the automatic transmission is in a parking range, and unlock the rotation of the power transmission shaft by setting the parking rod at an unlocked position on the other side in the axial direction, when the automatic transmission is in ranges other than the parking range;

a parking drive mechanism configured to set the parking rod at the locked position by biasing the parking rod, and set the parking rod at the unlocked position by supplying hydraulic pressure generated by operating an engine;

a hydraulic pressure control valve configured to intercept the supply of the hydraulic pressure to the parking drive mechanism when power is supplied thereto, and supply the hydraulic pressure to the parking drive mechanism when power is not supplied thereto;

a regulating mechanism configured to regulate the movement of the parking rod to the unlocked position when the parking rod is at the locked position; and a controller configured to control the supply of power to the hydraulic pressure control valve, wherein, when the parking rod is at the locked position, after power of a vehicle is turned OFF, the controller maintains the supply of power to the hydraulic pressure control valve, while an engine speed of the engine is higher than a given value.

2. The control device of claim 1, wherein the hydraulic pressure control valve is an on-off valve, and wherein, after the power of the vehicle is turned OFF, the controller supplies the power to the hydraulic pressure control valve to maintain an ON state of the hydraulic pressure control valve, while the engine speed of the engine is higher than the given value.

3. The control device of claim 2, wherein, after the power of the vehicle is turned OFF, the controller maintains the supply of power to the hydraulic pressure control valve, while the engine speed of the engine is higher than the given value, and suspends the supply of power to the hydraulic pressure control valve, when the engine speed of the engine becomes the given value or below.

4. The control device of claim 3, wherein, while the power of the vehicle is OFF, the controller starts the supply of power to the hydraulic pressure control valve, before the power of the vehicle is turned ON.

5. The control device of claim 4, wherein, while the power of the vehicle is OFF, the controller starts the supply of power to the hydraulic pressure control valve, when a door of the vehicle is opened.

6. The control device of claim 2, wherein, while the power of the vehicle is OFF, the controller starts the supply of power to the hydraulic pressure control valve, before the power of the vehicle is turned ON.

7. The control device of claim 6, wherein, while the power of the vehicle is OFF, the controller starts the supply of power to the hydraulic pressure control valve, when a door of the vehicle is opened.

8. The control device of claim 1, wherein, after the power of the vehicle is turned OFF, the controller maintains the supply of power to the hydraulic pressure control valve, while the engine speed of the engine is higher than the given value, and suspends the supply of power to the hydraulic pressure control valve, when the engine speed of the engine becomes the given value or below.

9. The control device of claim 8, wherein, while the power of the vehicle is OFF, the controller starts the supply of power to the hydraulic pressure control valve, before the power of the vehicle is turned ON.

10. The control device of claim 9, wherein, while the power of the vehicle is OFF, the controller starts the supply of power to the hydraulic pressure control valve, when a door of the vehicle is opened.

11. The control device of claim 1, wherein, while the power of the vehicle is OFF, the controller starts the supply of power to the hydraulic pressure control valve, before the power of the vehicle is turned ON.

12. The control device of claim 11, wherein, while the power of the vehicle is OFF, the controller starts the supply of power to the hydraulic pressure control valve, when a door of the vehicle is opened.

13. A control device for an automatic transmission, comprising:
- a parking lock mechanism, provided with a parking rod, configured to lock rotation of a power transmission shaft of the automatic transmission by setting the parking rod at a locked position on one side in an axial direction of the parking rod, when the automatic transmission is in a parking range, and unlock the rotation of the power transmission shaft by setting the parking rod at an unlocked position on the other side in the axial direction, when the automatic transmission is in ranges other than the parking range;
- a parking drive mechanism configured to set the parking rod at the locked position by biasing the parking rod, and set the parking rod at the unlocked position by supplying hydraulic pressure generated by operating an engine;
- a hydraulic pressure control valve configured to intercept the supply of the hydraulic pressure to the parking drive mechanism when power is supplied thereto, and supply the hydraulic pressure to the parking drive mechanism when power is not supplied thereto;
- a regulating mechanism configured to regulate the movement of the parking rod to the unlocked position when the parking rod is at the locked position; and
- a controller configured to control the hydraulic pressure control valve and the engine,
- wherein, after power of a vehicle is turned ON, the controller reduces an increase in an engine speed of the engine, during a period from an issuance of a power supply command to the hydraulic pressure control valve to a given period of time being elapsed.

14. The control device of claim 13,
- wherein the controller reduces the increase in the engine speed by inhibiting starting of the engine by a starter motor, and
- wherein the controller controls the starter motor so that the starter motor rotates a flywheel to start the engine after determining that the given period of time is elapsed.

* * * * *